(12) United States Patent
Oshima

(10) Patent No.: US 8,325,371 B2
(45) Date of Patent: Dec. 4, 2012

(54) JOB MANAGEMENT APPARATUS, CONTROL METHOD, AND PROGRAM

(75) Inventor: Keita Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 12/721,532

(22) Filed: Mar. 10, 2010

(65) Prior Publication Data

US 2010/0238496 A1 Sep. 23, 2010

(30) Foreign Application Priority Data

Mar. 17, 2009 (JP) ................. 2009-065220

(51) Int. Cl.
*G06F 3/12* (2006.01)

(52) U.S. Cl. ...... 358/1.15; 358/1.13; 707/736; 707/737; 707/752; 707/758

(58) Field of Classification Search ................. 358/1.13, 358/1.15, 1.18, 1.9, 2.1, 1.16, 3.23; 707/736, 707/737, 752, 758; 715/204, 210
See application file for complete search history.

(56) References Cited

U.S. PATENT DOCUMENTS

| 7,142,326 | B2 * | 11/2006 | Bondy et al. | 358/1.18 |
| 7,375,842 | B2 | 5/2008 | Kloosterman | |
| 2006/0023238 | A1 * | 2/2006 | Blaszyk et al. | 358/1.13 |
| 2009/0089315 | A1 * | 4/2009 | Jeffery et al. | 707/102 |

FOREIGN PATENT DOCUMENTS

JP 2003-316549 A 7/2003

* cited by examiner

*Primary Examiner* — Vu Hang
(74) *Attorney, Agent, or Firm* — Fitzpatrick, Cella, Harper & Scinto

(57) ABSTRACT

A job management apparatus, which managing, by record, a job based on content data which includes designations associated with a content used in variable data print processing, and a job ticket corresponding to the content data, comprising: a metadata extraction unit which extracts metadata from the content data; a metadata classification unit which classifies the extracted metadata as control metadata used to control processes of the job, and as display metadata used to make a display associated with the job; and a generation unit which generates first information used to display, by record, the job using values of the display metadata.

19 Claims, 27 Drawing Sheets

FIG. 2

| ID | NAME | ADDRESS | GENDER | AGE | OCCUPATION | HOBBY | ... |
|---|---|---|---|---|---|---|---|
| 1 | HANAKO YAMADA | TOKYO-TO ... | FEMALE | 23 | OFFICE WORKER | READING | |
| ... | ... | ... | ... | ... | ... | ... | |
| 235 | ICHIRO TANAKA | SAITAMA-KEN ... | MALE | 34 | SELF-EMPLOYED WORKER | TRAVEL | |
| 236 | TARO SATO | KANAGAWA-KEN ... | MALE | 45 | PUBLIC OFFICE WORKER | TENNIS | |
| 237 | KEITA OSHIMA | CHIBA-KEN ... | MALE | 20 | SELF-EMPLOYED WORKER | NONE | |
| 238 | KAZUKO YAMAMOTO | IBARAKI-KEN ... | FEMALE | 40 | HOUSEWIFE | MOVIEGOING | |
| 239 | ... | ... | ... | ... | ... | ... | |

FIG. 3

```
1  <PPML>
2   <JOB>
3    <METADATA>
4     <DATUM key="ID">1</DATUM>
5     <DATUM key="NAME">HANAKO YAMADA</DATUM>
6     <DATUM key="ADDRESS">TOKYO-TO...</DATUM>
7     <DATUM key="GENDER">FEMALE</DATUM>
8     <DATUM key="AGE">23</DATUM>
9     ...
10    ...
11    <DATUM key="BookSize">Small</DATUM>
12   </METADATA>
13   <DOCUMENT>
14    <METADATA>
15     <DATUM key="DocType">Cover</DATUM>
16    </METADATA>
17    <PAGE/>
18    <PAGE/>
19    ...
20   </DOCUMENT>
21   <DOCUMENT>
22    <METADATA>
23     <DATUM key="DocType">Body</DATUM>
24    </METADATA>
25    <PAGE/>
26    <PAGE/>
27    ...
28   </DOCUMENT>
29  </JOB>
30  <JOB>
31   ...
32   <DOCUMENT>...</DOCUMENT>
33  </JOB>
34  ...
35 </PPML>
```

FIG. 4A

```
1    <JDF>
2      ...
3      <RunList>
4        <MetadataMap DataType="PartIDKeys" Name="SetTags">
5          <Expr Path="METADATA/DATUM[@Key='ID']"/>
6        </MetadataMap>
7        <MetadataMap DataType="PartIDKeys" Name="DocTags">
8          <Expr Path="METADATA/DATUM[@Key='DocType']"/>
9        </MetadataMap>
10       <MetadataMap DataType="PartIDKeys" Name="Meta0">
11         <Expr Path="METADATA/DATUM[@Key='BookSize']"/>
12       </MetadataMap>
13       <MetadataMap DataType="PartIDKeys" Name="Meta1">
14         <Expr Path="METADATA/DATUM[@Key='GENDER']"/>
15       </MetadataMap>
16       <LayoutElement>
17         <FileSpec Sro="MyPPMLFile.ppml"/>
18       </LayoutElement>
19     </RunList>
```

FIG. 4B

```
20      <DigitalPrintingParams PartIDKeys="DocTags Meta0 Meta1">
21        <DigitalPrintingParams DocTags="Cover">
22          <DigitalPrintingParams Meta0="Small">
23            <DigitalPrintingParams Meta1="FEMALE">
24              <MediaRef rRef="PinkGlossyA4"/>
25            </DigitalPrintingParams>
26            <DigitalPrintingParams Meta1="MALE">
27              <MediaRef rRef="BlueGlossyA4"/>
28            </DigitalPrintingParams>
29          </DigitalPrintingParams>
30          <DigitalPrintingParams Meta0="Large">
31            <DigitalPrintingParams Meta1="FEMALE">
32              <MediaRef rRef="PinkGlossyA3"/>
33            </DigitalPrintingParams>
34            <DigitalPrintingParams Meta1="MALE">
35              <MediaRef rRef="BlueGlossyA3"/>
36            </DigitalPrintingParams>
37          </DigitalPrintingParams>
38        </DigitalPrintingParams>
39        <DigitalPrintingParams DocTags="Body">
40          ...
41          <DigitalPrintingParams Meta0="Large">
42            <MediaRef rRef="UncoatedA4"/>
43          </DigitalPrintingParams>
44          <DigitalPrintingParams Meta0="Small">
45            <MediaRef rRef="UncoatedA5"/>
46          </DigitalPrintingParams>
47          ...
48        </DigitalPrintingParams>
49      </DigitalPrintingParams>
50    ...
51  </JDF>
```

FIG. 5

```
1  <PPML>
2   <JOB>
3    <METADATA>
4     <DATUM key="ID" opt : type="DISPLAY">1</DATUM>
5     <DATUM key="NAME" opt : type="DISPLAY">HANAKO YAMADA</DATUM>
6     <DATUM key="ADDRESS" opt : type="DISPLAY">TOKYO-TO...</DATUM>
7     <DATUM key="GENDER" opt : type="DISPLAY">FEMALE</DATUM>
8     <DATUM key="AGE" opt : type="DISPLAY">23</DATUM>
9     ...
10    <DATUM key="BookSize" opt : type="DISPLAY">Small</DATUM>
11    <DATUM key="Additional_Meta0" opt : type="CONTROL">Small</DATUM>
12    <DATUM key="Additional_Meta1" opt : type="CONTROL">FEMALE</DATUM>
13   </METADATA>
14   <DOCUMENT>
15    <METADATA>
16    <DATUM key="DocType" opt : type="CONTROL">Cover</DATUM>
17    </METADATA>
18    <PAGE></PAGE>
19    <PAGE></PAGE>
20   </DOCUMENT>
21   <DOCUMENT>
22    <METADATA>
23     <DATUM key="DocType" opt : type="CONTROL">Body</DATUM>
24    </METADATA>
25    <PAGE></PAGE>
26    <PAGE></PAGE>
27   </DOCUMENT>
28  </JOB>
29  <JOB>
30   ...
31   <DOCUMENT>...</DOCUMENT>
32  </JOB>
33  ...
34 </PPML>
```

FIG. 6A

```
1    <JDF>
2      ...
3      <RunList>
4        <MetadataMap DataType="PartIDKeys" Name="DocTags">
5          <Expr Path="METADATA/DATUM[@Key='DocType']"/>
6        </MetadataMap>
7        <MetadataMap DataType="PartIDKeys" Name="Meta0">
8          <Expr Path="METADATA/DATUM[@Key='Additional_Meta0']"/>
9        </MetadataMap>
10       <MetadataMap DataType="PartIDKeys" Name="Meta1">
11         <Expr Path="METADATA/DATUM[@Key='Additional_Meta1']"/>
12       </MetadataMap>
13       <LayoutElement>
14         <FileSpec Sro="MyPPMLFile.ppml" />
15       </LayoutElement>
16     </RunList>
```

F I G. 6B

```
17      <DigitalPrintingParams PartIDKeys="DocTags Meta0 Meta1">
18        <DigitalPrintingParams DocTags="Cover">
19          <DigitalPrintingParams Meta0="Small">
20            <DigitalPrintingParams Meta1="FEMALE">
21              <MediaRef rRef="PinkGlossyA4"/>
22            </DigitalPrintingParams>
23            <DigitalPrintingParams Meta1="MALE">
24              <MediaRef rRef="BlueGlossyA4"/>
25            </DigitalPrintingParams>
26          </DigitalPrintingParams>
27          <DigitalPrintingParams Meta0="Large">
28            <DigitalPrintingParams Meta1="FEMALE">
29              <MediaRef rRef="PinkGlossyA3"/>
30            </DigitalPrintingParams>
31            <DigitalPrintingParams Meta1="MALE">
32              <MediaRef rRef="BlueGlossyA3"/>
33            </DigitalPrintingParams>
34          </DigitalPrintingParams>
35        </DigitalPrintingParams>
36        <DigitalPrintingParams DocTags="Body">
37          ...
38          <DigitalPrintingParams Meta0="Large">
39            <MediaRef rRef="UncoatedA4"/>
40          </DigitalPrintingParams>
41          <DigitalPrintingParams Meta0="Small">
42            <MediaRef rRef="UncoatedA5"/>
43          </DigitalPrintingParams>
44          ...
45        </DigitalPrintingParams>
46      </DigitalPrintingParams>
47      ...
48    </JDF>
```

FIG. 8

| JOB MANAGEMENT | | | | | |
|---|---|---|---|---|---|
| Job No. | Job Description | | | | |
| 12 | ○○○ JYUKU TEXT PRINTING | | | | |
| | ID | NAME | ADDRESS | GENDER | AGE | STATUS |
| - | 1 | YAMADA... | TOKYO... | FEMALE | 23 | IN PROGRESS |
| - | 2 | TANAKA... | TOKYO... | MALE | 35 | COMPLETE |
| - | 3 | SATO... | TOKYO... | MALE | 24 | COMPLETE |
| - | 4 | SUZUKI... | KANA... | FEMALE | 40 | IN PROGRESS |
| - | 5 | YAMAMOTO... | KAN... | | 50 | WAITING |
| - | 6 | SHIMIZU... | KAN... | | 23 | WAITING |
| - | 7 | INOUE... | KAN... | | 31 | WAITING |
| 13 | △△△TOURS BOOKLET | | | | |
| | ID | NAME | A... | | NUMBER | |
| - | 1 | KINOSHITA... | TOKYO... | | 23345244 | WAITING |
| - | 2 | OYAMA... | TOKYO... | | 12374439 | WAITING |
| - | 3 | KAWAKAMI... | TOKYO... | | 12129439 | WAITING |
| 14 | K.K. ×××BROCHURE PRINTING | | | | | WAITING |
| 15 | ●●● TEXT | | | | | WAITING |

CANCEL / DELETE / SETTING — 130, 131, 132

| Job No. | Job Description | | | | Status |
|---|---|---|---|---|---|
| 12 | ☐ ○○○ JYUKU TEXT PRINTING | | | | COMPLETE |
| — | ID | NAME | ADDRESS | GENDER | AGE | |
| — | 1 | YAMADA... | TOKYO... | FEMALE | 23 | COMPLETE |
| — | 2 | TANAKA... | TOKYO... | MALE | 35 | COMPLETE |
| — | 3 | SATO... | TOKYO... | MALE | | COMPLETE |
| — | 4 | SUZUKI... | KANA... | FEMALE | 24 | COMPLETE |
| — | 5 | YAMAMOTO... | KANA... | | 40 | COMPLETE |
| — | 6 | SHIMIZU... | KANA... | | | COMPLETE |
| — | 7 | INOUE... | KANA... | | | COMPLETE |
| 13 | ☐ △△△ TOURS BOOKLET | | | | |
| — | ID | NAME | ADDRESS | | | |
| — | 1 | KINOSHITA... | TOKYO... | 23345244 | | COMPLETE |
| — | 2 | OYAMA... | TOKYO... | 12374439 | | COMPLETE |
| — | 3 | KAWAKAMI... | TOKYO... | 12129439 | | COMPLETE |
| 14 | ⊞ K.K. ×××BROCHURE PRINTING | | | | COMPLETE |
| 15 | ⊞ ●●● TEXT | | | | COMPLETE |

Buttons: RE-PRINT (133), DELETE (131), SETTING (132)

FIG. 11

| | Job No. | Job Description | | | | | STATUS |
|---|---|---|---|---|---|---|---|
| 106 | 12 | ⊟ ○○○ JYUKU TEXT PRINTING | | | | | COMPLETE |
| | | ID | NAME | ADDRESS | GENDER | AGE | |
| 107 | – | 1 | YAMADA... | TOKYO... | FEMALE | 23 | COMPLETE |
| 108 | – | 2 | TANAKA... | TOKYO... | MALE | 35 | COMPLETE |
| 109 | – | 3 | SATO... | TOKYO... | MALE | 24 | COMPLETE |
| 110 | – | 4 | SUZUKI... | KANA... | FEMALE | 40 | COMPLETE |
| 111 | – | 5 | YAMAMOTO... | KANA... | MALE | 50 | COMPLETE |
| 112 | – | 6 | SHIMIZU... | KANA... | MALE | 23 | COMPLETE |
| 113 | – | 7 | INOUE... | KANA... | MALE | 31 | COMPLETE |
| | 13 | ⊞ △△△ TOURS BOOKLET | | | | | COMPLETE |
| | 14 | ⊞ K.K. ×××BROCHURE PRINTING | | | | | IN PROGRESS |
| | 15 | ⊞ ●●● TEXT | | | | | COMPLETE |
| 140 | 16 | ⊟ ○○○ JYUKU TEXT PRINTING | | | | | IN PROGRESS |
| | | ID | NAME | ADDRESS | GENDER | AGE | |
| 141 | – | 1 | YAMADA... | TOKYO... | FEMALE | 23 | WAITING |
| 142 | – | 4 | SUZUKI... | KANA... | FEMALE | 40 | |
| 143 | – | 5 | YAMAMOTO... | KANA... | MALE | 50 | |

FIG. 15A

| METADATA | DISPLAY | CONTROL |
|---|---|---|
| ID | 1 | 0 |
| NAME | 1 | 0 |
| ADDRESS | 1 | 0 |
| GENDER | 1 | 1 |
| AGE | 1 | 0 |
| ... | ... | ... |
| ... | ... | ... |
| BookSize | 1 | 1 |
| DocType | 0 | 1 |
| ... | ... | ... |

FIG. 15B

| METADATA | DISPLAY | CONTROL |
|---|---|---|
| ID | 1 | 0 |
| NAME | 1 | 0 |
| ADDRESS | 1 | 0 |
| GENDER | 1 | 0 |
| AGE | 1 | 0 |
| ... | ... | ... |
| ... | ... | ... |
| BookSize | 1 | 0 |
| DocType | 0 | 1 |
| Additional_Meta0 | 0 | 1 |
| Additional_Meta1 | 0 | 1 |

F I G. 20

```
1  <PPML>
2   <JOB>
3    <METADATA>
4     <DATUM key="ID" opt : type="DISPLAY">1</DATUM>
5     <DATUM key="NAME" opt : type="DISPLAY">HANAKO YAMADA</DATUM>
6     <DATUM key="ADDRESS" opt : type="DISPLAY">TOKYO-TO...</DATUM>
7     <DATUM key="GENDER" opt : type="DISPLAY">FEMALE</DATUM>
8     <DATUM key="AGE" opt : type="DISPLAY">23</DATUM>
9     <DATUM key="OCCUPATION" opt : type="DISPLAY">OFFICE WORKER</DATUM>
10    <DATUM key="HOBBY" opt : type="DISPLAY">READING</DATUM>
11    <DATUM key="BookSize" opt : type="CONTROL">Small</DATUM>
12    <DATUM key="Additional_Meta1" opt : type="CONTROL">FEMALE</DATUM>
13   </METADATA>
14   <DOCUMENT>
15    <METADATA>
16    <DATUM key="DocType" opt : type="CONTROL">Cover</DATUM>
17    </METADATA>
18    <PAGE></PAGE>
19    <PAGE></PAGE>
20   </DOCUMENT>
21   <DOCUMENT>
22    <METADATA>
23     <DATUM key="DocType" opt : type="CONTROL">Body</DATUM>
24    </METADATA>
25    <PAGE></PAGE>
26    <PAGE></PAGE>
27   </DOCUMENT>
28  </JOB>
29  <JOB>
30    ...
31    <DOCUMENT>...</DOCUMENT>
32  </JOB>
33   ...
34 </PPML>
```

F I G. 21A

```
1    <JDF>
2      ...
3      <RunList>
4        <MetadataMap DataType="PartIDKeys" Name="DocTags">
5          <Expr Path="METADATA/DATUM[@Key='DocType']"/>
6        </MetadataMap>
7        <MetadataMap DataType="PartIDKeys" Name="Meta0">
8          <Expr Path="METADATA/DATUM[@Key='BookSize']"/>
9        </MetadataMap>
10       <MetadataMap DataType="PartIDKeys" Name="Meta1">
11         <Expr Path="METADATA/DATUM[@Key='Additional_Meta1']"/>
12       </MetadataMap>
13       <LayoutElement>
14         <FileSpec Sro="MyPPMLFile.ppml" />
15       </LayoutElement>
16     </RunList>
```

FIG. 21B

```
17      <DigitalPrintingParams PartIDKeys="DocTags Meta0 Meta1">
18        <DigitalPrintingParams DocTags="Cover">
19          <DigitalPrintingParams Meta0="Small">
20            <DigitalPrintingParams Meta1="FEMALE">
21              <MediaRef rRef="PinkGlossyA4"/>
22            </DigitalPrintingParams>
23            <DigitalPrintingParams Meta1="MALE">
24              <MediaRef rRef="BlueGlossyA4"/>
25            </DigitalPrintingParams>
26          </DigitalPrintingParams>
27          <DigitalPrintingParams Meta0="Large">
28            <DigitalPrintingParams Meta1="FEMALE">
29              <MediaRef rRef="PinkGlossyA3"/>
30            </DigitalPrintingParams>
31            <DigitalPrintingParams Meta1="MALE">
32              <MediaRef rRef="BlueGlossyA3"/>
33            </DigitalPrintingParams>
34          </DigitalPrintingParams>
35        </DigitalPrintingParams>
36        <DigitalPrintingParams DocTags="Body">
37          ...
38          <DigitalPrintingParams Meta0="Large">
39            <MediaRef rRef="UncoatedA4"/>
40          </DigitalPrintingParams>
41          <DigitalPrintingParams Meta0="Small">
42            <MediaRef rRef="UncoatedA5"/>
43          </DigitalPrintingParams>
44          ...
45        </DigitalPrintingParams>
46      </DigitalPrintingParams>
47      ...
48   </JDF>
```

F I G. 22

```
1  <PPML>
2   <JOB>
3    <METADATA>
4     <DATUM key="ID" opt : type="DISPLAY">1</DATUM>
5     <DATUM key="BookSize" opt : type="CONTROL">Small</DATUM>
6     <DATUM key="Additional_Meta1" opt : type="CONTROL">FEMALE</DATUM>
7    </METADATA>
8    <DOCUMENT>
9     <METADATA>
10     <DATUM key="DocType" opt : type="CONTROL">Cover</DATUM>
11    </METADATA>
12    <PAGE></PAGE>
13    <PAGE></PAGE>
14   </DOCUMENT>
15   <DOCUMENT>
16    <METADATA>
17     <DATUM key="DocType" opt : type="CONTROL">Body</DATUM>
18    </METADATA>
19    <PAGE></PAGE>
20    <PAGE></PAGE>
21   </DOCUMENT>
22  </JOB>
23  <JOB>
24   ...
25   <DOCUMENT>...</DOCUMENT>
26  </JOB>
27  ...
28 </PPML>
```

FIG. 23

| Job No. | Job Description | | | | STATUS |
|---|---|---|---|---|---|
| 12 | ⊟ ○○○ JYUKU TEXT PRINTING | | | | |
| | ID | NAME | ADDRESS | GENDER | AGE | |
| | 1 | | | | | COMPLETE |
| | 2 | | | | | COMPLETE |
| | 3 | | | | | COMPLETE |
| | 4 | | | | | COMPLETE |
| | 5 | | | | | COMPLETE |
| | 6 | | | | | COMPLETE |
| | 7 | | | | | COMPLETE |
| 13 | ⊟ TOURS BOOKLET | | | | |
| | ID | NAME | ADDRESS | CUSTOMER NUMBER | |
| | 1 | | | | COMPLETE |
| | 2 | | | | COMPLETE |
| | 3 | | | | COMPLETE |
| 14 | ⊞ K.K. ×××BROCHURE PRINTING | | | | |
| 15 | ⊞ ●●● TEXT | | | | |

□ JOB MANAGEMENT 100
101
106 — 12
107 — 
108 — 
109 — 
110 — 
111 — 
112 — 
113 —

JOB MANAGEMENT APPARATUS, CONTROL METHOD, AND PROGRAM

BACKGROUND OF THE INVENTION

1. Field of the Invention

The present invention relates to a job management apparatus which manages a print job, a control method thereof, and a program.

2. Description of the Related Art

As one of features of a POD device, variable data print (to be abbreviated as VDP hereinafter) processing which allows different print processes for respective outputs is known. In the current commercial print market, VDP processing which gives a high added value to products has prevailed, and standardization of PPML (Personalized Print Markup Language), PDF/VT, and the like has progressed. Also, job management is done by operating, for respective records, a VDP job which has already entered into a print workflow. That is, the progress status and history are displayed and re-print and editing instructions are issued by designating a record number of the VDP job.

On the other hand, cooperation between the VDP processing and a job ticket is demanded to heighten an added value. For example, bookbinding of printed products including variable print data, that of different appearances, and the like are demanded. As a standardized technique that meets such demands, use of metadata in a JDF (Job Definition Format) is available. By referring to metadata embedded in PPML or PDF/VT data from the JDF, records in a VDP job and bookbinding appearances are linked. Conventionally, a related art that relates to a VDP job using the standardized format is available (see Japanese Patent Laid-Open No. 2003-316549).

Metadata of PPML data or the like roughly include two different types of metadata: information (a name, address, etc.) derived from a database as a generation source of a VDP job, and information (distinction between a cover and body text, etc.) to be controlled by a job ticket. The former information (display metadata) is useful as information to be referred to in correspondence with a record unit of a job upon operating the VDP job, as described above. On the other hand, the latter information (to be referred to as control metadata hereinafter) is useful to allow setting display/editing processes (paper selection, page range designation, etc.) of each record unit job.

For this reason, metadata included in content data and a job ticket have to be discriminated as display metadata and control metadata. However, it is not easy to automatically determine these metadata from a metadata group included in a VDP content such as PPML data. Metadata referred to from a job ticket may often also include display metadata. Hence, upon managing a job generated by a conventional VDP generation application, even when the standardized format such as the PPML is used, it is limited to display record unit information using metadata. For example, a job management unit of a print workflow can use metadata only in case of a job generated by a dedicated VDP application.

SUMMARY OF THE INVENTION

The present invention considers the aforementioned problems, and can enhance, e.g., the operability of job management in a VDP job that uses metadata by appropriately discriminating use applications of metadata in the VDP job.

According to one aspect of the present invention, there is provided a job management apparatus, which managing, by record, a job based on content data which includes designations associated with a content used in variable data print processing, and a job ticket corresponding to the content data, comprising: a metadata extraction unit which extracts metadata from the content data; a metadata classification unit which classifies the extracted metadata as control metadata used to control processes of the job, and as display metadata used to make a display associated with the job; and a generation unit which generates first information used to display, by record, the job using values of the display metadata.

According to another aspect of the present invention, there is provided a job management apparatus, which manages a job based on content data including designations associated with a content used in variable data print processing, and a corresponding job ticket, comprising: a metadata extraction unit which extracts metadata from the content data; a metadata classification unit which classifies the extracted metadata according to use applications; a content data editing unit which edits the content data to be assigned with identification information used to identify each use application of the metadata based on a classification result of the metadata classification unit; a job ticket editing unit which edits information used to refer to the metadata in the job ticket based on the classification result of the metadata classification unit; and a holding unit which holds the edited content data and job ticket.

According to another aspect of the present invention, there is provided a method of controlling a job management apparatus, which managing, by record, a job based on content data which includes designations associated with a content used in variable data print processing, and a job ticket corresponding to the content data, comprising: a metadata extraction step of controlling a metadata extraction unit of the job management apparatus to extract metadata from the content data; a metadata classification step of controlling a metadata classification unit of the job management apparatus to classify the extracted metadata as control metadata used to control processes of the job, and as display metadata used to make a display associated with the job; and a generation step of controlling a generation unit of the job management apparatus to generate first information used to display, by record, the job using values of the display metadata.

According to another aspect of the present invention, there is provided a method of controlling a job management apparatus, which manages a job based on content data including designations associated with a content used in variable data print processing, and a corresponding job ticket, comprising: a metadata extraction step of controlling a metadata extraction unit of the job management apparatus to extract metadata from the content data; a metadata classification step of controlling a metadata classification unit of the job management apparatus to classify the extracted metadata according to use applications; a content data editing step of controlling a content data editing unit of the job management apparatus to edit the content data to be assigned with identification information used to identify each use application of the metadata based on a classification result in the metadata classification step; a job ticket editing step of controlling a job ticket editing unit of the job management apparatus to edit information used to refer to the metadata in the job ticket based on the classification result in the metadata classification step; and a holding step of controlling a holding unit of the job management apparatus to hold the edited content data and job ticket.

As described above, according to the present invention, for example, the operability of job management in a VDP job using metadata can be expected to be enhanced by appropriately discriminating use applications of metadata in the VDP job.

Further features of the present invention will become apparent from the following description of exemplary embodiments (with reference to the attached drawings).

BRIEF DESCRIPTION OF THE DRAWINGS

FIG. 2 is a table showing an example of information stored in a database according to the embodiment;

FIG. 3 is a view showing an example of content data according to the embodiment;

FIGS. 4A and 4B are views showing an example of job ticket data according to the embodiment;

FIG. 5 is a view showing an example of edited data according to the embodiment;

FIGS. 6A and 6B are views showing an example of edited data according to the embodiment;

FIG. 8 is a view showing an example of a user interface window according to the embodiment;

FIG. 10 is a view showing an example of a user interface window according to the embodiment;

FIG. 11 is a view showing an example of a user interface window according to the embodiment;

FIGS. 15A and 15B are views showing an example of the data structure according to the embodiment;

FIG. 20 is a view showing an example of content data according to the second embodiment;

FIGS. 21A and 21B are views showing an example of a job ticket according to the second embodiment;

FIG. 22 is a view showing an example of content data according to the third embodiment;

FIG. 23 is a view showing an example of a user interface window according to the third embodiment.

DESCRIPTION OF THE EMBODIMENTS

<First Embodiment>

Embodiments of the present invention will be described in detail hereinafter with reference to the drawings.

[Overall Arrangement of Job Management System]

Figure 1:
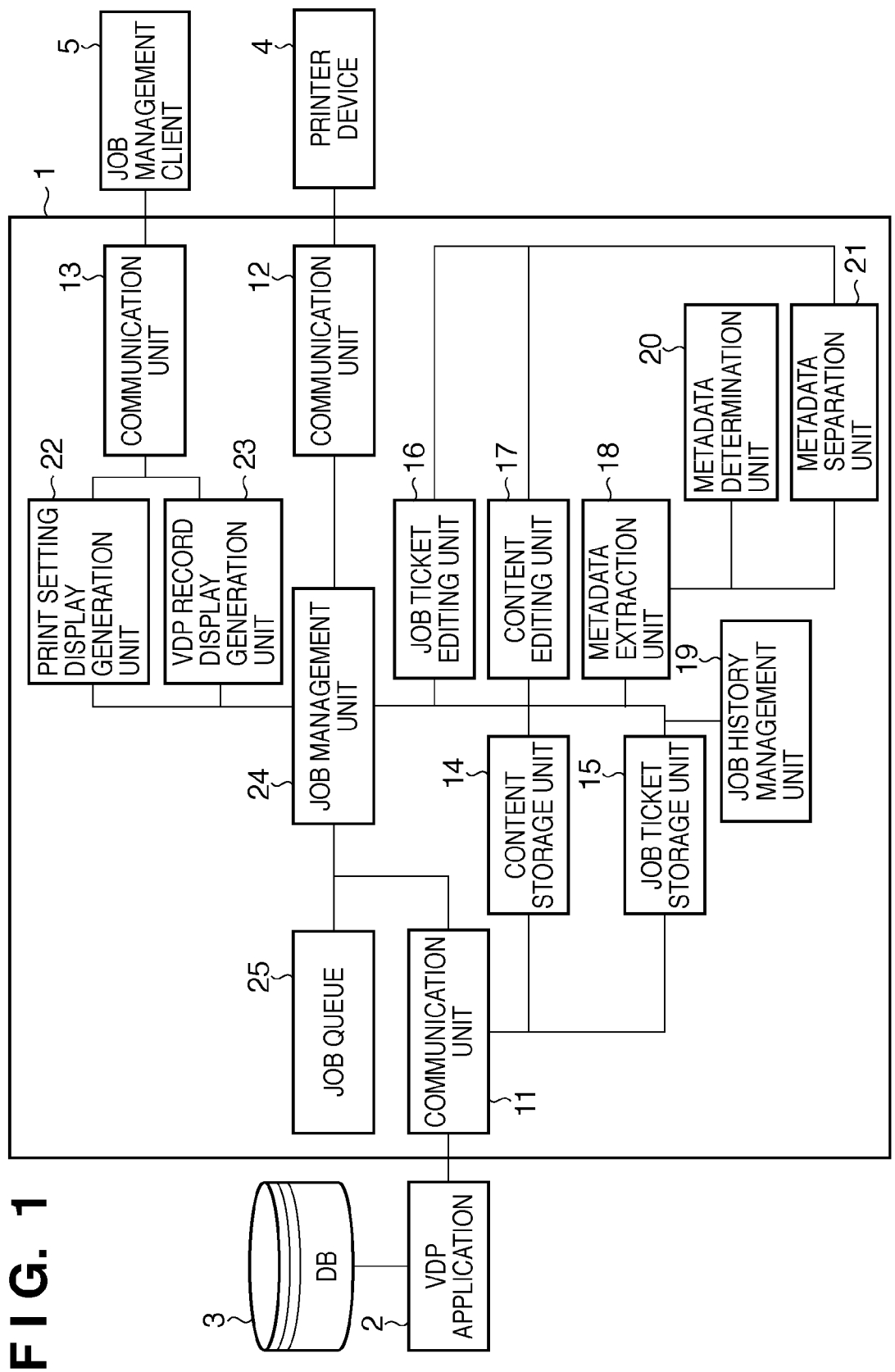
FIG. 1 is a block diagram showing an example of the overall arrangement of a job management apparatus according to an embodiment of the present invention.

FIG. 1 is a block diagram showing an example of a server as a job management system according to the present invention, and a VDP application, printer device, and client terminal connected to the server. Functions of respective blocks will be described below with reference to FIG. 1.

A job management server 1 accepts a variable data print (VDP) job from a VDP application 2, and issues an output instruction to a printer device 4. The VDP application 2 acquires record information as a source of the VDP job from a database 3, and generates, for example, a VDP content such as PPML data and a job ticket such as JDF data. The VDP application 2 then transmits a set of the VDP content and job ticket as a VDP job to the job management server 1. The printer device 4 has a function of interpreting the VDP content and job ticket generated by the VDP application 2, and executing print processing and post-processing such as book-binding processing. A job management client 5 is connected to the job management server 1, and is allowed to browse information associated with jobs on the job management server, and to edit settings associated with jobs. Assume that connection between the job management client 5 and job management server 1 uses a client-server model technique such as a Web application.

A communication unit 11 receives a VDP job from the VDP application 2, and stores content data in a content storage unit 14 and a job ticket in a job ticket storage unit 15. The communication unit 11 notifies a job management unit 24 of reception of the job. The job management unit 24 enters the received job into a job queue 25. Data held in the job queue is management information alone, and the content data and job ticket are held in the content storage unit 14 and job ticket storage unit 15 to be linked with the management information.

Upon reception of the VDP job, a metadata extraction unit 18 extracts display metadata and control metadata from the content data and job ticket. In this case, a metadata determination unit 20 determines the types of metadata included in the content data and job ticket. A metadata separation unit 21 separates the data extracted by the metadata extraction unit 18 into display metadata and control metadata. A content editing unit 17 edits the content data according to the separation result of the metadata separation unit 21. A job ticket editing unit 16 edits the job ticket according to the separation result of the metadata separation unit 21. The job management unit 24 executes job management based on the content data and job ticket as the edit results of the content editing unit 17 and job ticket editing unit 16.

Also, the job management unit 24 provides a user interface window, which is generated and provided by a print setting display generation unit 22 and VDP record display generation unit 23, to the job management client 5 via a communication unit 13. The job management unit 24 sends the job entered in the job queue 25 to the printer device 4 via a communication unit 12. The job to be sent to the printer device includes the content data and job ticket stored in the content storage unit 14 and job ticket storage unit 15. The job management unit 24 acquires the status of the printer device 4 via the communication unit 12, and executes progress management and history management. As for a job and records whose print processing is complete, the job management unit 24 receives return data associated with completion of job processing from the printer device 4, and a job history management unit 19 holds the return data in association with the content data and job ticket.

The user of the VDP application 2 in this embodiment defines a logic based on customer information for each print case ordered from a customer. The VDP application 2 acquires information from the database 3 based on the logic for each case, and generates a VDP print job. Respective case logics use different pieces of information for respective cases.

In this embodiment, a user who requires a printout operation holds customer information associated with each case.

Then, the user provides printed books having different appearances and contents in correspondence with the characteristics of customers for respective user's customers. The characteristics of the user's customers are held in the database 3. Note that each case logic includes, for example, definitions of fields to be printed, and definitions of a print format.

FIG. 2 is a table showing an example of information stored in the database 3 according to the embodiment of the present invention. In the table shown in FIG. 2, each row includes pieces of information for each customer. Respective columns indicate types of information associated with the customers. The first column indicates an identifier (ID) assigned to each customer. The second column indicates a name of each customer. The third column indicates an address of each customer. The fourth column indicates a gender of each customer. The fifth column indicates an age of each customer. The sixth column indicates an occupation of each customer. The seventh column indicates a hobby of each customer. In the database 3, the eighth and subsequent columns record information, but these pieces of information are omitted in this embodiment. For example, as shown in FIG. 2, as for a customer of the first row (ID=1), [name] is "Hanako Yamada", [gender] is "female", and [age] is "23 years old".

An example of a case logic in this embodiment will be described below based on the information of the table shown in FIG. 2. In this embodiment, the user executes print bookbinding processing that changes output appearances in accordance with ages and genders of customers. More specifically, the VDP application 2 realizes the following two conditions:

[Bookbinding Condition]

Condition 1: use blue paper for males and pink paper for females as a cover.

Condition 2: use bookbinding of an A5 size (small size) for customers of less than 40 years old, and that of an A4 size (large size) for customers of 40 years or higher.

The VDP application 2 generates content data (PPML data) and a job ticket (JDF data) based on the above two conditions.

FIG. 3 shows an example of content data generated by the VDP application 2 according to this embodiment. The content data according to this embodiment is compliant with the PPML format, and adopts a format of a text document using a markup language defined by the XML. However, FIG. 3 uses a simple expression of only portions required for the description of this embodiment, and is not strictly compliant with the XML and PPML specifications. The PPML format has a mechanism that refers to external data to be printed. However, in the description of this embodiment, page data as a reference destination is omitted. FIG. 3 describes data for 35 lines. However, the line numbers are assigned for the descriptive convenience of this embodiment, and are not elements of PPML content data. Also, the 9th, 10th, 19th, 27th, 31st, and 34th lines do not include any detailed descriptions, and actual content data includes contents which are not described in FIG. 3.

The content data of this embodiment has a data structure including four layers. The uppermost layer corresponds to whole content data (PPML: 1st to 35th lines). The next layer corresponds to a job (JOB: 2nd to 29th lines and 30th to 33rd lines). The next layer corresponds to a document (DOCUMENT: 13th to 20th lines, 21st to 28th lines, and 32nd line). The lowermost layer corresponds to a page (PAGE: 17th, 18th, 25th, and 26th lines). According to the definition of the PPML format, still other layers exist, but they are omitted in the example of FIG. 3.

The whole content data corresponds to all print data including those for a plurality of customers. The whole content data includes jobs as many as the number of target customers. A job is print data corresponding to one customer. A job in the 2nd to 29th lines corresponds to the first customer in the content data shown in FIG. 3. Likewise, job data corresponding to customers follow as many as the number of customers to be printed, but FIG. 3 does not describe these job data. The document corresponds to a plurality of print data included in one job. The job of this embodiment includes two documents, i.e., print data for a cover and that for body text. The document includes a plurality of page data.

In the example shown in FIG. 3, the job layer and document layer include metadata. Metadata corresponding to the job in the 2nd to 29th lines is included in a description in the 3rd to 12th lines. Metadata corresponding to the document in the 13th to 20th lines is included in a description in the 14th to 16th lines. Metadata corresponding to the document in the 21st to 28th lines is included in a description in the 22nd to 24th lines. The description of each metadata describes one or more sets of individual items and values. The description of the metadata corresponding to the job in the 3rd to 12th lines includes descriptions of eight sets. The seven sets from the 4th line to the 10th line describe intact items of the database information shown in FIG. 2 for each customer.

Data in the 11th line describes a book size (Large/Small) determined according to condition 2 in the aforementioned case logic. The description of the metadata corresponding to the document in the 14th to 16th lines includes a description of one set. The 15th line indicates that a type (Key="DocType") of this document is "Cover". Likewise, the 23rd line indicates that a type of the other document of this job is "Body".

FIGS. 4A and 4B show an example of job ticket data generated by the VDP application 2 according to this embodiment. FIGS. 4A and 4B shows a job ticket paired with the content data shown in FIG. 3. The job ticket data according to this embodiment is compliant with the JDF format, and adopts a format of a text document using a markup language defined by the XML. Note that FIGS. 4A and 4B use a simple expression of only portions required for the description of this embodiment, and is not strictly compliant with the XML and JDF specifications. FIGS. 4A and 4B describe data for 51 lines. As in the content data shown in FIG. 3, FIGS. 4A and 4B describe only portions required for the description of this embodiment, and the 2nd, 40th, 47th, and 50th lines do not include any detailed descriptions.

Referring to FIG. 4A, the 3rd to 19th lines describe the correspondence with the corresponding content data (FIG. 3). The 17th line designates a file name of the content data shown in FIG. 3. The 4th to 15th lines define the relationship between the metadata in FIG. 3 and the descriptions in the job ticket shown in FIGS. 4A and 4B. For example, in the 4th to 6th lines, a Path attribute indicates that a DATUM element having a Key attribute value [ID] below a METADATA element in FIG. 3 is referred to as a name [SetTags] in FIGS. 4A and 4B. Likewise, metadata [DocType], [BookSize], and [gender] in FIG. 3 are respectively referred to as arguments of names "DocTags", "Meta0", and "Meta1" in FIGS. 4A and 4B. The 20th to 49th lines indicate paper selection instruction portions as an example of information set in the job ticket. Initially, the 20th line declares that the settings are switched based on values of "DocTags", "Meta0", and "Meta1". The subsequent lines are described to have a hierarchical structure of these three metadata.

For example, the 24th line indicates to select "PinkGlossyA4" paper when [DocTags], [Meta0], and [Meta1] respectively have parameters "Cover", "Small", and "female" in correspondence with the contents of the content data. Note that "Cover" indicates [cover], "Small" indicates

[small book size], the "female" indicates [for female], and "PinkGlossyA4" indicates [A4-size pink glossy paper]. Note that the job ticket shown in FIGS. 4A and 4B separately describes a detailed description of the paper selection instruction corresponding to "PinkGlossyA4", i.e., a paper size and paper type.

Likewise, the 27th line designates "BlueGlossyA4" (A4-size blue glossy paper) when [DocTags], [Meta0], and [Meta1] respectively have parameters "Cover", "Small", and "male". The 32nd line designates "PinkGlossyA3" (A3-size pink glossy paper) when [DocTags], [Meta0], and [Meta1] respectively have parameters "Cover", "Large", and "female".

The 35th line designates "BlueGlossyA3" (A3-size blue glossy paper) when [DocTags], [Meta0], and [Meta1] respectively have parameters "Cover", "Large", and "male". The 42nd line designates "UncoatedA4" (A4-size plain paper) when [DocTags] and [Meta0] are respectively "Body" (body text) and "Large". The 45th line designates "UncoatedA5" (A5-size plain paper) when [DocTags] and [Meta0] are respectively "Body" and "Small".

The printer device 4 identifies the aforementioned combinations of the content data and job ticket data, and can output books having different appearances for respective customers. However, the job management server 1 interprets the content data and job ticket and edits them to allow easy management before it transmits the job to the printer device 4.

FIG. 5 shows the edit result of the content data shown in FIG. 3 by the job management server 1 according to this embodiment. The updated contents from FIG. 3 to FIG. 5 will be described below. Initially, information of the metadata [BookSize] in the 11th line in FIG. 3 is copied, and new metadata [Additional_Meta0] in the 11th line in FIG. 5 is added. Information of the metadata [gender] in the 7th line in FIG. 3 is copied, and new metadata [Additional Meta1] in the 12th line in FIG. 5 is added. To each of metadata descriptions in the 4th to 12th lines, 16th line, and 23rd line in FIG. 5, identification information including an [opt:type] attribute is appended. When this attribute value is "CONTROL", it indicates that the metadata is used as a print setting control parameter. When this attribute value is "DISPLAY", it indicates that the metadata is information to be displayed in a record unit display mode of a job. By these conversions of the content data, display metadata and control metadata in the content data can be identified.

FIGS. 6A and 6B show the edit result of the job ticket data shown in FIGS. 4A and 4B by the job management server 1 according to this embodiment. The updated contents from FIGS. 4A and 4B to FIGS. 6A and 6B will be described below. Initially, a description of the metadata corresponding to the ID described in the 4th to 6th lines in FIG. 4A is deleted. Since this metadata is not used in control in the job ticket data (i.e., it is not referred to), it is deleted. In correspondence with the modification of the content data in FIG. 5, the name of the metadata is changed from [BookSize] in the 11th line in FIG. 4A to [Additional_Meta0] in the 8th line in FIG. 6A. Also, the name of the metadata is changed from [gender] in the 14th line in FIG. 4A to [Additional_Meta1] in the 11th line in FIG. 6A.

[User Interface Window]

Figure 7:
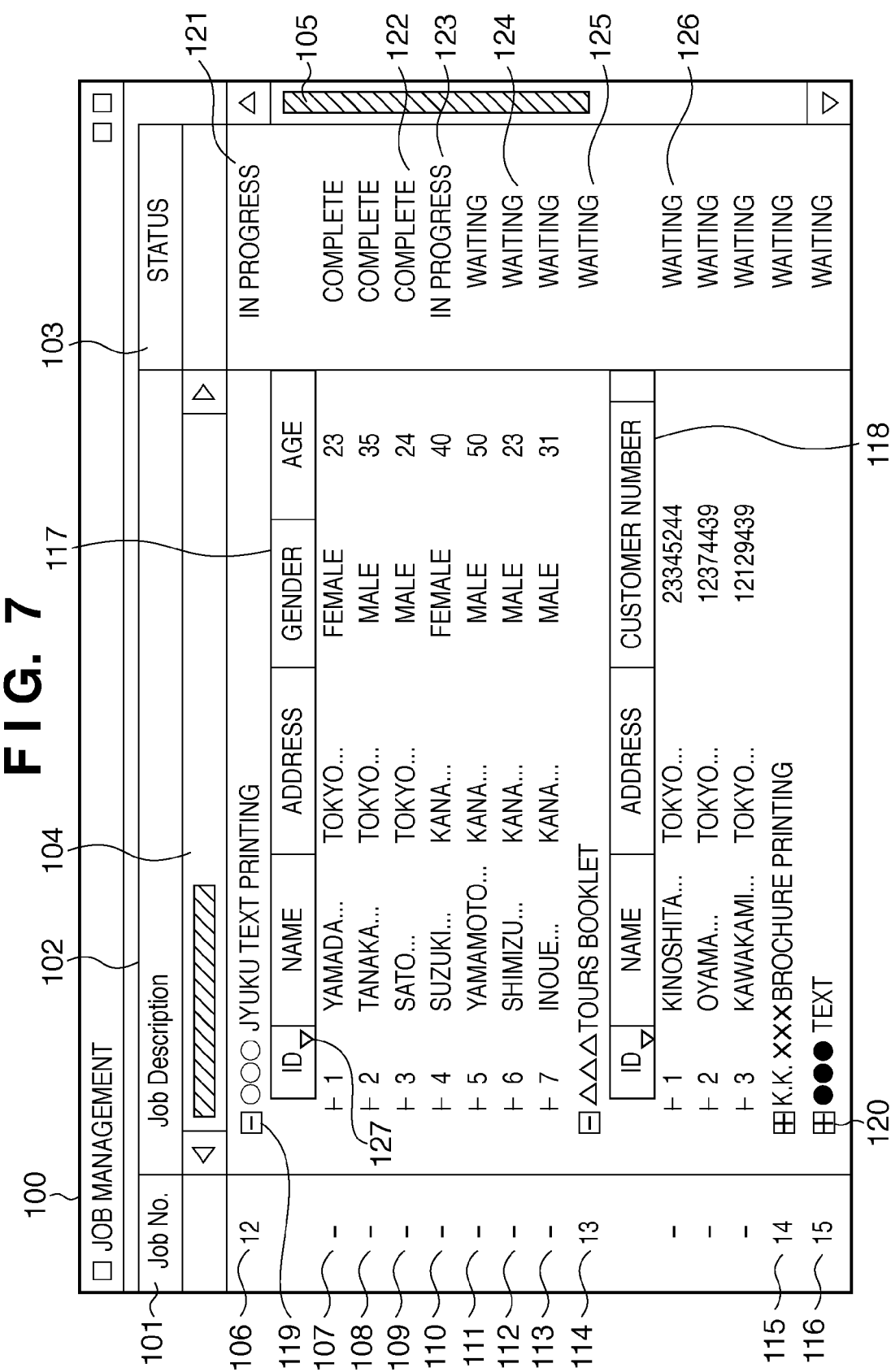
FIG. 7 is a view showing an example of a user interface window according to the embodiment.

An example of a user interface window which can be displayed and edited by the job management server 1 based on the job information updated to the formats shown in FIGS. 5 and 6 will be described below. FIG. 7 shows an example of a user interface window according to this embodiment. The window shown in FIG. 7 is generated by the VDP record display generation unit 23, and is displayable and accessible from the job management client 5.

FIG. 7 shows an example of the window which displays a list of jobs that are received by the job management server 1 and are held in the job queue 25 in a VDP record unit display mode. Referring to FIG. 7, a whole window 100 mainly includes three divided display areas in the horizontal direction. A left area 101 displays job numbers managed in the job queue 25. A central area 102 displays job information in correspondence with the job numbers displayed on the left area 101. The central area 102 also displays record unit information in each job. A right area 103 displays current statuses in correspondence with pieces of job unit and record unit information displayed on the central area 102. A horizontal scroll bar 104 and vertical scroll bar 105 are used to control the display position in the window. In the example of FIG. 7, the left area 101 displays four jobs 106, 114, 115, and 116. Job numbers [12], [13], [14], and [15] are respectively assigned to these jobs.

Furthermore, as can be seen from browsing of the left area 101 and central area 102 in combination, pieces of record information included in the jobs 106 and 114 are expanded and displayed. For example, as for the job number [12], pieces of record unit information 107 to 113 are displayed. Note that the left area 101 does not display any job number for each record unit information. A display/non-display mode of record unit information is identified and switched by a portion allocated at the upper left corner of each job on the central area 102. For example, a portion 119 indicates by means of [−] that pieces of record unit information are displayed in the job with the job number [12]. Also, a portion 120 indicates by means of [+] that a record unit display of the job with the job number [15] is omitted. Assume that the record unit display/non-display mode can also be switched by clicking the portion 119 or 120.

When pieces of record unit information are expanded and displayed, items of record unit information are displayed like a record item bar 117 or 118. For example, in case of the job number [12], items [ID], [name], [address], [gender], and [age] are displayed like the record item bar 117. Note that a hidden display portion can be confirmed by operating the horizontal scroll bar 104. Likewise, in case of the job number [13], items [ID], [name], [address], and [customer number] are displayed like the record item bar 118. As these items, display information metadata of content data of each individual job are enumerated. That is, taking FIG. 5 as an example, metadata appended with the "DISPLAY" attribute values in the 4th to 10th lines are used. Respective pieces of record unit information are displayed in correspondence with an item list of each job. For example, as can be seen from first displayed record unit information 107 in the job number [12], [ID] is "1", [name] is "Yamada . . . ", [address] is "Tokyo . . . ", [gender] is "female", and [age] is "23". Some portions are hidden depending on the states of the respective display areas, and they can be adjusted on the UI window. Likewise, the same applies to pieces of record unit information 108 to 113. These pieces of record unit information are different for respective jobs. For example, as for the job number [13], items different from those of the job number [12] are displayed. When there are a plurality of metadata items to be displayed, an item used to sort and display other items can be selected. In FIG. 7, a portion 127 indicates that pieces of record unit information of the job number [12] are sorted and displayed based on [ID]. When pieces of information to be displayed are sorted using another item, the sort item can be selected by clicking the corresponding item on the record item bar 117. In this manner, since pieces of information can be sorted based on an arbitrary metadata item, the visibility of the record unit display can be improved.

The right area 103 displays statuses in correspondence with the pieces of job unit and record unit information displayed on the central area 102. For example, a status 121 indicates that the job with the job number [12] is "in progress". A status 122 indicates that print processing of record unit information 109 in the job with the job number [12] is "complete". A status 123 indicates that print processing of record unit information 110 is currently "in progress". A status 124 indicates that record unit information 112 is "waiting". Likewise, a status 125 indicates that the job number [13] is "waiting", and a status 126 indicates that the first record of the job number [13] is "waiting".

As described above, since pieces of record unit information can be individually displayed on the record unit progress display/management window of jobs, what kind of records the displayed records are can be easily identified. In FIG. 7, by selecting a job or record, job unit or record unit control and setting editing processing can be executed.

FIG. 8 shows an example of a user interface window when the user selects one record and is about to operate it on the job management window shown in FIG. 7. In FIG. 8, an operation list for the selected record is displayed as a drop-down menu. A button 130 is used to cancel print processing of the selected record. A button 131 is used to delete the selected record. A button 132 is used to edit settings corresponding to the selected record. By selecting the button 132, the user can confirm and edit job unit and record unit print settings.

Figure 9:
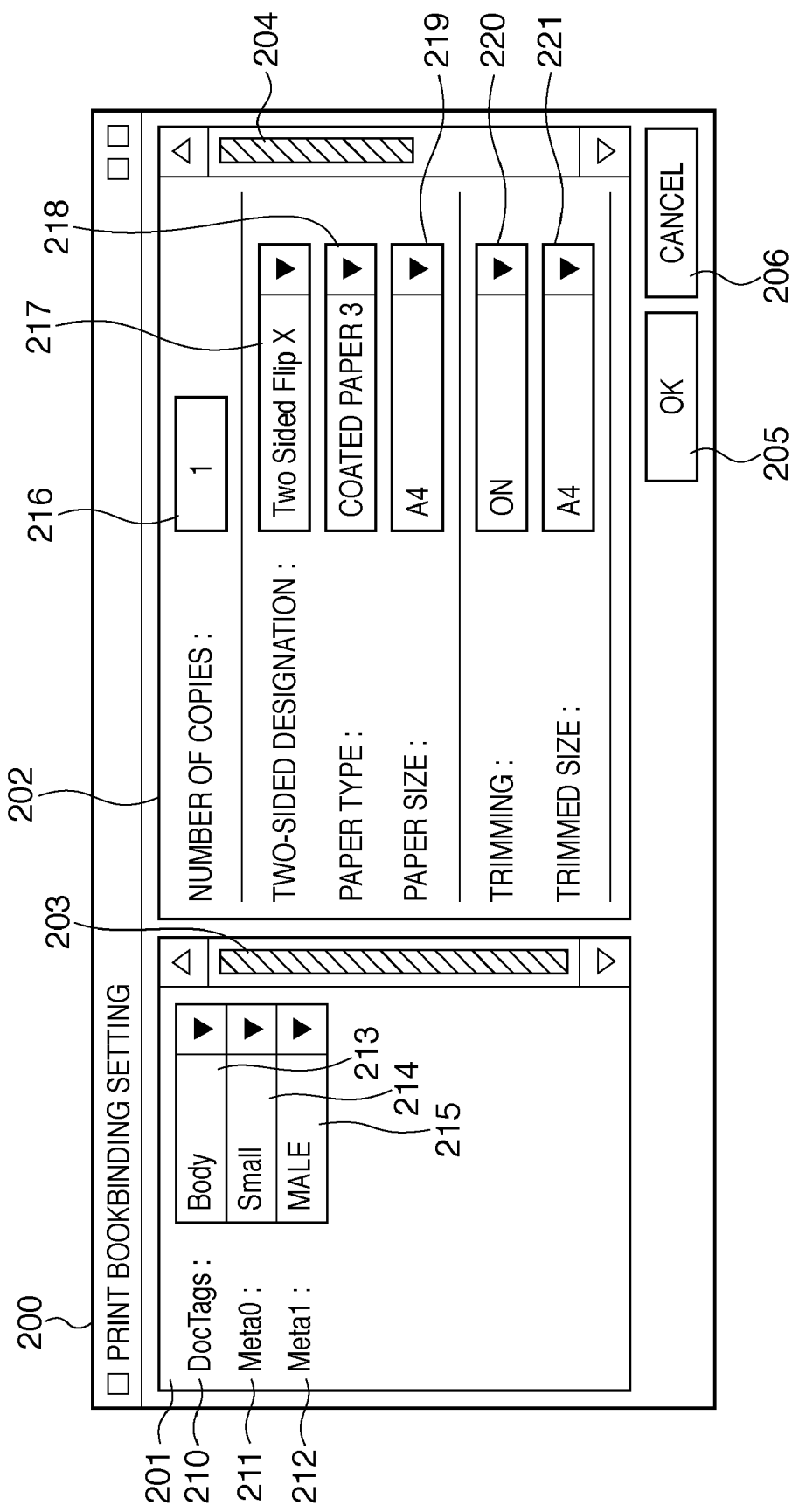
FIG. 9 is a view showing an example of a user interface window according to the embodiment.

FIG. 9 shows an example of a user interface window displayed when the user selects the button 132 in FIG. 8. The window shown in FIG. 9 is generated by the print setting display generation unit 22, and is displayable and accessible from the job management client 5. Referring to FIG. 9, a whole window 200 mainly includes two divided display areas in the horizontal direction. A left area 201 displays a combination of metadata values. A right area 202 displays a list of print bookbinding settings corresponding to the combination of metadata values displayed on the left area 201. By re-selecting a metadata value on the left area 201, the display contents on the right area 202 are switched to those corresponding to the selected metadata. Both the left area 201 and right area 202 have scroll bars used to adjust the display position of hidden portions on the window. A vertical scroll bar 203 is used to scroll the left area 201 in the vertical direction. A vertical scroll bar 204 is used to scroll the right area 202 in the vertical direction. The user presses an OK button 205 when he or she wants to reflect, to the job, the print bookbinding setting values corresponding to the combination of metadata after he or she changes them. On the other hand, the user presses a cancel button 206 not to reflect the settings to the job.

In the example of FIG. 9, the left area 201 displays three metadata. Metadata [DocTags] 210 is set to have a value "Body" 213. Metadata [Meta0] 211 is set to have a value "Small" 214. Metadata [Meta1] 212 is set to have a value "male" 215. That is, the print settings corresponding to the combination of these metadata values in the state shown in FIG. 9 are displayed on the right area 202.

Furthermore, by editing the print settings displayed on the right area 202, the print bookbinding settings corresponding to the combination of these metadata values are changed. When the user changes an arbitrary metadata value on the left area 201, he or she can refer to/edit the print bookbinding settings corresponding to another combination of metadata values. Note that the metadata displayed on the left area 201 enumerate control metadata in a job ticket of a corresponding job. That is, taking FIG. 6A as an example, keys of metadata in the 4th, 7th, and 10th lines are enumerated. The metadata values use values which are referred to in the job ticket shown in FIGS. 6A and 6B.

The print bookbinding settings displayed on the right area 202 display description portions in job ticket data corresponding to the combination of metadata displayed on the left area 201. For example, taking FIGS. 6A and 6B as an example, the settings displayed on the right area 202 correspond to a description from the 36th line including the value "Body" of [DocTags]. Furthermore, the settings on the right area 202 correspond to a description of the 41st line including the value "Small" of [Meta0]. Since the corresponding description portion in FIGS. 6A and 6B does not designate [Meta1], the 42nd line corresponds to the display/setting portion on the right area 202 in association with the paper setting. As for other print settings, the description portions of the job ticket corresponding to the combination of the metadata values are similarly reflected on the right area 202. Conversely, upon reflecting the edit result on the right area 202 to the job, the corresponding portions of the job ticket are edited in correspondence with the input contents on the user interface.

FIG. 10 shows a window when the user selects a plurality of partial records to execute re-print processing on the job list shown in FIG. 7. In FIG. 10, the user selects records of pieces of record unit information 107, 110, and 111. By pressing a button 133 on the drop-down menu, the user can issue a re-print instruction of the selected records. Even when the user selects partial records to execute re-print processing, as shown in FIG. 10, appropriate records can be selected based on metadata.

Furthermore, FIG. 11 shows an example of a job list display window during the re-print processing. As shown in FIG. 11, it is difficult for the user to recognize details by only the job unit display of a job 140. However, since pieces of record unit metadata information, i.e., pieces of record unit information 141 to 143, can be simultaneously displayed, the visibility of the job at the time of re-print processing can also be enhanced.

[Sequence of Processing]

Figure 12:
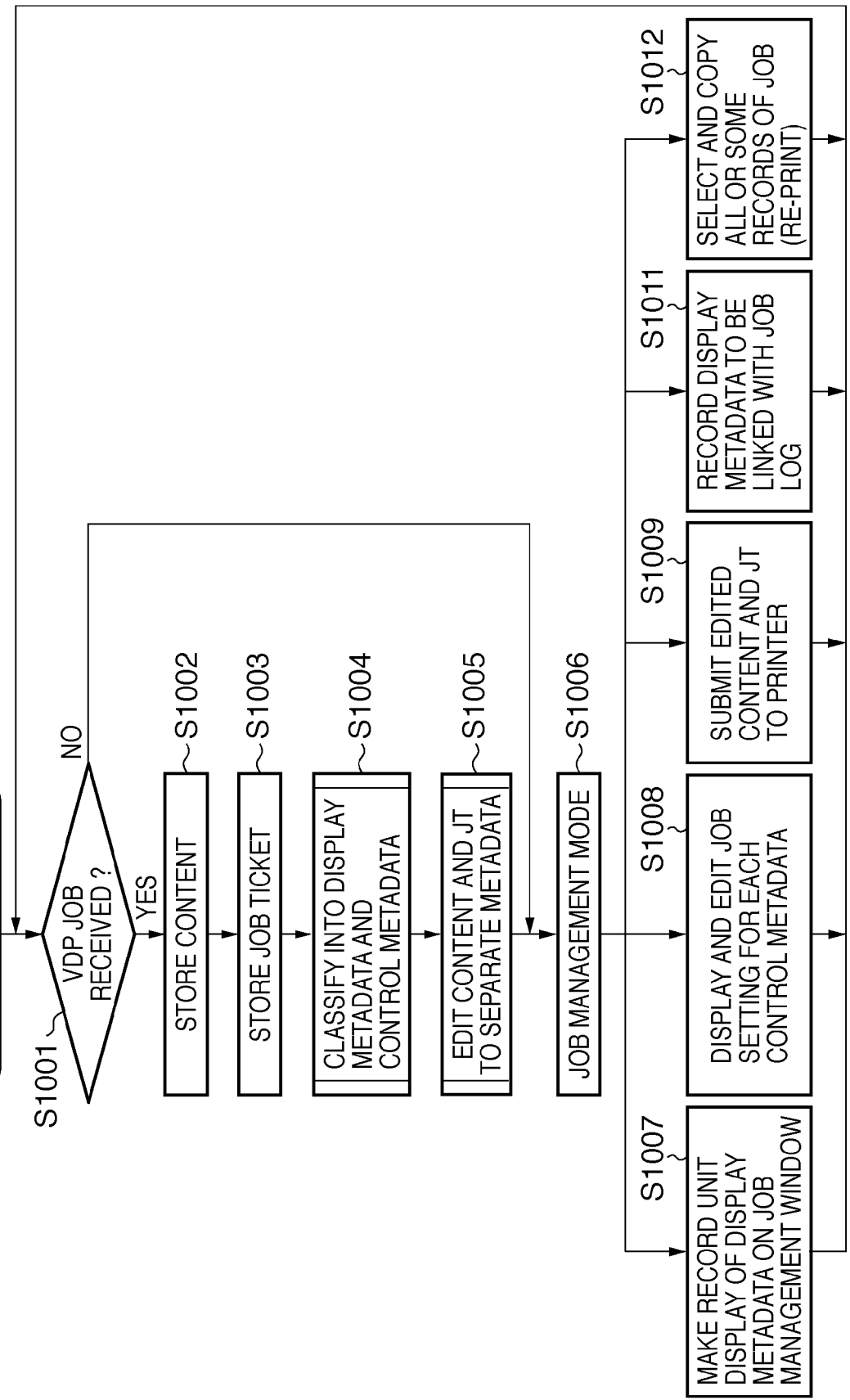
FIG. 12 is a flowchart showing processing according to the embodiment.

FIG. 12 is a flowchart showing an example of the sequence of processing of the job management server 1 according to this embodiment.

In step S1000, the processing starts. The job management unit 24 determines in step S1001 if a VDP job is input via the communication unit 11. If a VDP job is received ("YES" in step S1001), the process advances to step S1002. If no VDP job is input ("NO" in step S1001), the process jumps to step S1006. In step S1002, the content storage unit 14 receives content data via the communication unit 11, and stores the received content data. In step S1003, the job ticket storage unit 15 receives a job ticket via the communication unit 11, and stores the received job ticket. In step S1004, the metadata extraction unit 18 classifies metadata in the stored content data and job ticket into display metadata and control metadata in cooperation with the respective processing units. The classification processing will be described later with reference to FIG. 13. In step S1005, the metadata extraction unit 18 edits the input content data and job ticket in cooperation with the respective processing unit to separate the metadata depending on use applications. The separation processing will be described later with reference to FIG. 14.

In step S1006, the job management unit 24 branches processes from steps S1007 to S1012 according to the processing contents based on a user instruction. Assume that five job management modes are available. In step S1007, the VDP record display generation unit 23 generates a job management window based on respective pieces of job information shown in, e.g., FIG. 7. The VDP record display generation unit 23 functions as a job information display generation unit. The generated job management window is displayed on the job management client 5 via the communication unit 13. In step S1008, the print setting display generation unit 22 generates a print bookbinding setting window shown in, e.g., FIG. 9. The print bookbinding setting window is displayed on the job management client 5 via the communication unit 13.

In step S1009, the job management unit 24 transmits the edited content data and job ticket to the printer device 4 via the communication unit 12 in accordance with an operation from the job management client 5. In step S1011, the job management unit 24 acquires a job execution result from the printer device 4 via the communication unit 12. The job management unit 24 records display metadata included in the job in the job history management unit 19 in association with history information. Upon displaying a job history after the print processing, the job management unit 24 acquires information from the job history management unit 19. In step S1012, the job management unit 24 selects all or some records of a job selected to execute re-print processing, and copies them as a new job in accordance with an operation from the job management client 5. After the process returns to step S1006 for the next time, the job management unit 24 transmits the copied job to the printer device 4 in step S1009. Upon completion of the processes in steps S1007 to S1012, the process returns to step S1001 to repeat the aforementioned processes.

<Metadata Classification Processing>

Figure 13:
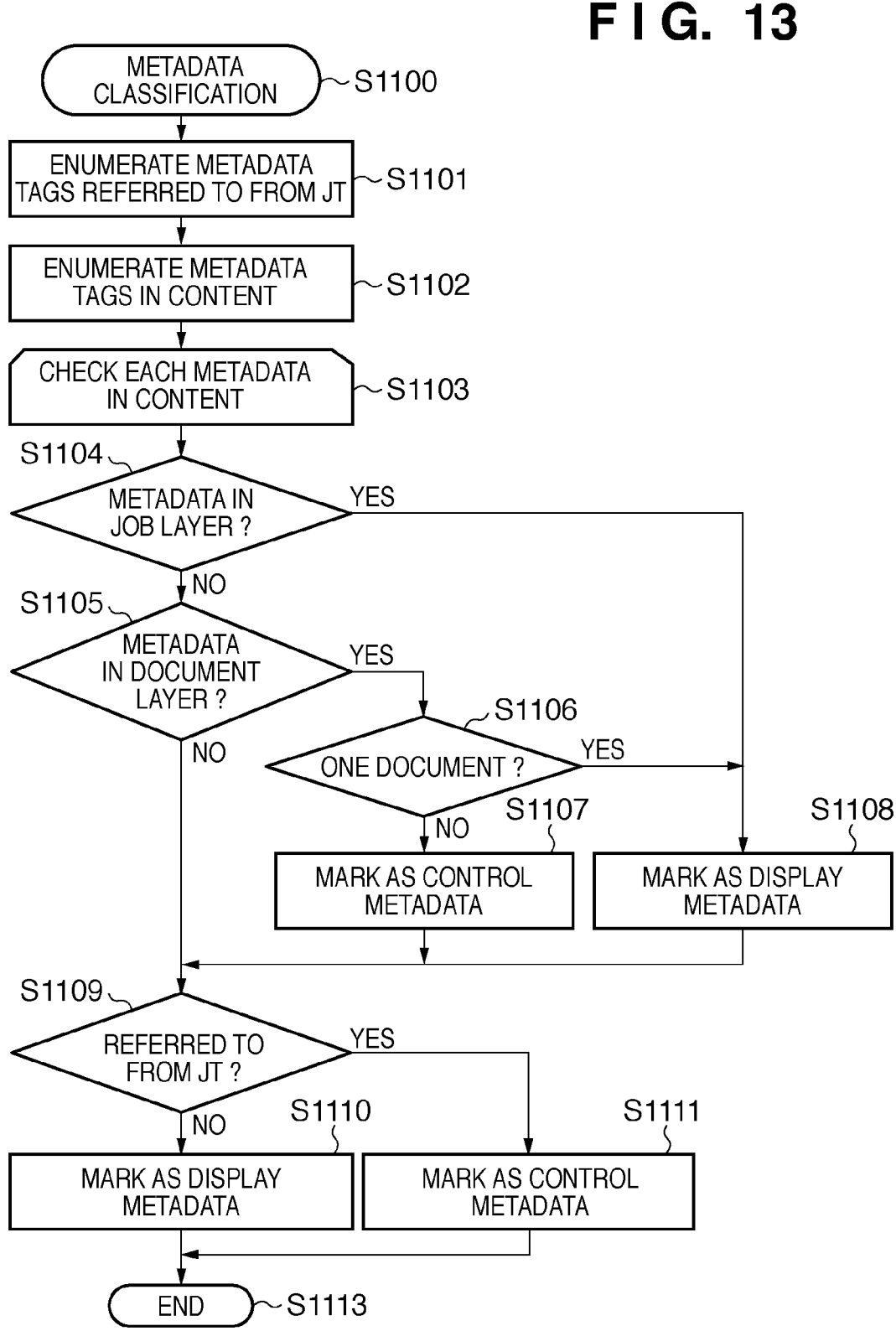
FIG. 13 is a flowchart showing metadata classification processing according to the embodiment.

Details of the metadata classification processing in step S1004 will be described below. FIG. 13 is a flowchart showing an example of the sequence of processing corresponding to the process in step S1004 in FIG. 12.

In step S1100, the processing starts. In step S1101, the metadata determination unit 20 enumerates metadata which are referred to in the job ticket. For example, in the job ticket shown in FIGS. 4A and 4B, tags [DocTags], [Meta0], and [Meta1] in the job ticket are referred to, but a tag [SetTags] is not referred to. Hence, the metadata determination unit 20 enumerates three metadata [DocType], [BookSize], and [gender] as corresponding metadata. In this case, assume that other metadata are not referred to in portions which are not shown in the example of FIGS. 4A and 4B. In step S1102, the metadata determination unit 20 enumerates metadata tags defined in the content data. For example, in the content data shown in FIG. 3, the metadata determination unit 20 enumerates key attribute values of DATUM elements bounded by METADATA tags. More specifically, the metadata determination unit 20 enumerates metadata [ID], [name], [address], [gender], [age], [BookSize], [DocType], and the like.

In step S1103, the metadata determination unit 20 repeats the processes in steps S1104 to S1111 for each of the metadata enumerated in step S1102. After the processes for all the metadata are complete, the processing ends. The metadata determination unit 20 checks in step S1104 if metadata of interest is that in a job layer, i.e., that in a layer of a JOB tag. Since one value per job is decided for the metadata in the job layer, that metadata is not control metadata in the job ticket. That is, the metadata of interest is likely to be display metadata. If the metadata of interest is that in the job layer ("YES" in step S1104), the process advances to step S1108; otherwise ("NO" in step S1104), the process advances to step S1105.

The metadata determination unit 20 checks in step S1105 if the metadata of interest is that in a document layer, i.e., that in a layer of a DOCUMENT tag. If the metadata of interest is that in the document layer ("YES" in step S1105), the process advances to step S1106; otherwise ("NO" in step S1105), the process advances to step S1109. The metadata determination unit 20 checks in step S1106 whether the content data include one or a plurality of documents. Even when the metadata of interest is included in the document layer, if the content data includes one document, one value per job of that metadata is decided. Therefore, the metadata of interest is likely to be display metadata as in the job layer. If the content data includes one document ("YES" in step S1106), the process advances to step S1108; otherwise, i.e., if the content data includes a plurality of documents ("NO" in step S1106), the process advances to step S1107.

In step S1107, the metadata determination unit 20 marks the metadata of interest as control metadata, and stores the marked metadata. After that, the process advances to step S1109. In step S1108, the metadata determination unit 20 marks the metadata of interest as display metadata, and stores the marked metadata. After that, the process advances to step S1109. The metadata determination unit 20 checks in step S1109 based on the contents enumerated in step S1101 if the metadata of interest is referred to from the job ticket. If the metadata of interest is referred to from the job ticket ("YES" in step S1109), the process advances to step S1111; otherwise ("NO" in step S1109), the process advances to step S1110.

In step S1110, the metadata determination unit 20 marks the metadata of interest as display metadata, and stores the marked metadata. In step S1111, the metadata determination unit 20 marks the metadata of interest as control metadata, and stores the marked metadata. If it is determined that metadata to be processed still remain, the process returns to step S1103 to repeat the processes for other metadata. If the processes are complete for all metadata, this sequence ends in step S1113.

With the above processes, the following classification of all metadata included in the content data and job ticket is complete.

1. Display metadata (only a mark of display metadata is appended)
2. Control metadata (only a mark of control metadata is appended)
3. Display metadata and control metadata (both marks are appended)
4. Metadata falling outside these use applications (no mark is appended)

The classification result data are returned to the metadata extraction unit 18 as information of appended marks that classify the metadata.

<Metadata Separation Processing>

Figure 14:
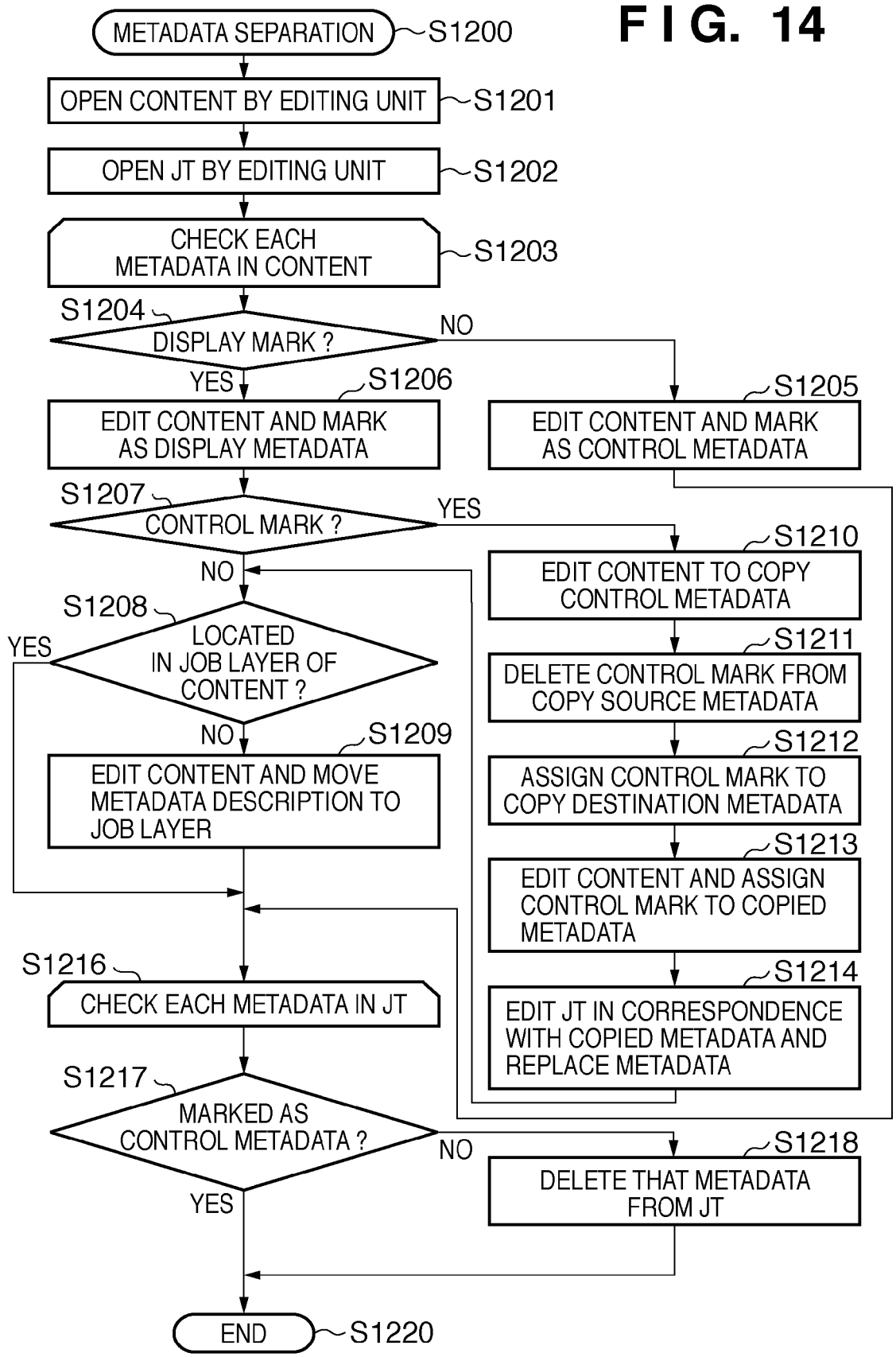
FIG. 14 is a flowchart showing metadata separation processing according to the embodiment.

Processing for editing the content data and job ticket based on the classification information obtained by the processing in FIG. 13 will be described below. FIG. 14 is a flowchart showing an example of the sequence of processing corresponding to the process in step S1005 in FIG. 12. The metadata extraction unit 18 controls the metadata separation unit 21 to update the content data and job ticket based on the classification result data from the metadata determination unit 20.

In step S1200, the processing starts. In step S1201, the content editing unit 17 opens the content data of interest so as to edit it. In step S1202, the job ticket editing unit 16 opens the job ticket of interest so as to edit it. In step S1203, the metadata separation unit 21 repeats the processes from steps S1204 to S1214 for respective metadata in the content data. The metadata separation unit 21 checks in step S1204 based on the processing result in FIG. 13 if metadata of interest is appended with a display mark. If the metadata of interest is appended with a mark of display metadata ("YES" in step S1204), the process advances to step S1206; otherwise ("NO" in step S1204), the process advances to step S1205.

In step S1205, the content editing unit 17 edits the content data to add a control mark to the metadata of interest. More specifically, for example, the content editing unit 17 adds an attribute [opt:type="CONTROL"] in the 16th or 23rd line in FIG. 5. In step S1206, the content editing unit 17 edits the content data to add a display mark to the metadata of interest. More specifically, for example, the content editing unit 17 adds an attribute of identification information [opt:type="DISPLAY"] in the 4th line and the like in FIG. 5. After that, the process advances to step S1207.

The metadata separation unit 21 checks in step S1207 based on the processing result in FIG. 13 if a control mark is also appended to the metadata of interest. If a mark of control metadata is appended to the metadata of interest, i.e., if both the marks of display and control metadata are appended to the metadata of interest ("YES" in step S1207), the process advances to step S1210; otherwise ("NO" in step S1207), the process advances to step S1208. The metadata separation unit 21 checks in step S1208 if the metadata of interest belongs to in the job layer of the content data. If the metadata of interest belongs to the job layer ("YES" in step S1208), it returns to S1203, and it processes to next metadata in content. If the metadata of interest does not belong to the job layer ("NO" in step S1208), the process to step S1209. In step S1209, the content editing unit 17 edits the content data to move a description of the metadata of interest to the position of the job layer. It returns to S1203, and it processes to next metadata in content.

With the processes in steps S1210 to S1214, the content data is edited to include two metadata, i.e., display and control metadata having an equal value as the metadata which is classified as both the display and control metadata. As a result, a content data editing unit is implemented. In step S1210, the content editing unit 17 edits the content data to copy the metadata of interest described as display metadata. More specifically, for example, the content editing unit 17 copies the 7th line in FIG. 5, and adds the 12th line. Then, the content editing unit 17 changes the key value to a new value [Additional_Meta1]. In this case, assume that a new metadata name which is not used in the content data is used. The content editing unit 17 copies all metadata [gender] in the content data to this [Additional_Meta1]. The metadata value holds the same value [female] as in the 5th line. After that, the process advances to step S1211.

In step S1211, the metadata separation unit 21 deletes the mark of control metadata from copy source metadata in the classification result data (FIG. 15B to be described later). That is, in the aforementioned example, [gender] metadata is excluded from the classification of the control metadata. After that, the process advances to step S1212. In step S1212, the metadata separation unit 21 appends a mark as control metadata to copy destination metadata in the classification result data (FIG. 15B to be described later). That is, in the aforementioned example, [Additional_Meta1] metadata is classified as control metadata. After that, the process advances to step S1213.

In step S1213, the content editing unit 17 edits the content data to add a control mark to the copy destination metadata. More specifically, for example, the content editing unit 17 updates an [opt:type] attribute as identification information in the 12th line in FIG. 5 to "CONTROL". After that, the process advances to step S1214.

In step S1214, the job ticket editing unit 16 replaces metadata in the job ticket in correspondence with that copied in the content data. More specifically, for example, the job ticket editing unit 16 changes an [@key] value to "Additional Meta1" as in the 11th line in FIG. 6A. After that, the process advances to step S1208. If it is determined that the processes in step S1204 and subsequent steps are complete for all metadata of interest in the content data, the process advances to step S1216. If metadata of interest to be processed still remain, the processes in step S1204 and subsequent steps are repeated.

In step S1216, the metadata separation unit 21 repeats the processes in steps S1217 and S1218 for all metadata of interest in the job ticket. The metadata separation unit 21 checks in step S1217 if the metadata of interest is marked as control metadata. If the metadata of interest is not marked as control metadata ("NO" in step S1217), the process advances to step S1218. If the metadata of interest is marked as control metadata ("YES" in step S1217), it returns to S1216, and it processes to next metadata in JT. In step S1218, the job ticket editing unit 16 deletes a description associated with the metadata of interest from the job ticket. More specifically, for example, a description from the 4th to 6th lines in FIG. 4A is associated with metadata [ID]. However, since this metadata is not determined as control metadata, it is deleted in FIGS. 6A and 6B. If it is determined that the processes in steps S1217 and S1218 are complete for all metadata of interest in the job ticket, the process advances to step S1220; if metadata of interest to be processed still remain, the process in steps S1217 and S1218 are applied to metadata of interest to be processed. Upon completion of the editing processing of the content data and job ticket for all metadata, the content data and job ticket are closed in step S1220, thus ending the processing.

[Metadata Classification Data Structure]

An example of the data structure associated with the metadata classification processing will be described below with reference to FIGS. 15A and 15B. FIG. 15A shows an example of the data structure according to this embodiment. FIG. 15A shows the data structure which expresses the metadata types held in the metadata determination unit 20 and metadata separation unit 21. An example of the data shown in FIG. 15A corresponds to the content data shown in FIG. 3 and the job ticket shown in FIGS. 4A and 4B at the time of completion of the processing in FIG. 13. The data structure shown in FIG. 15A has a table structure. This table includes display metadata flags and control metadata flags in correspondence with the names of metadata. In an initial state, both flags are cleared to zero. When metadata is marked as display metadata, a display flag value is set to be "1". Likewise, when metadata is marked as control metadata, a control flag value is set to be "1".

FIG. 15B shows an example of the data structure which similarly expresses the data types in this embodiment. An example of the data shown in FIG. 15B corresponds to the content data shown in FIG. 5 and the job ticket shown in FIGS. 6A and 6B at the time of completion of the processing shown in FIG. 14.

[Arrangement of Server and Client PC]

Figure 16:
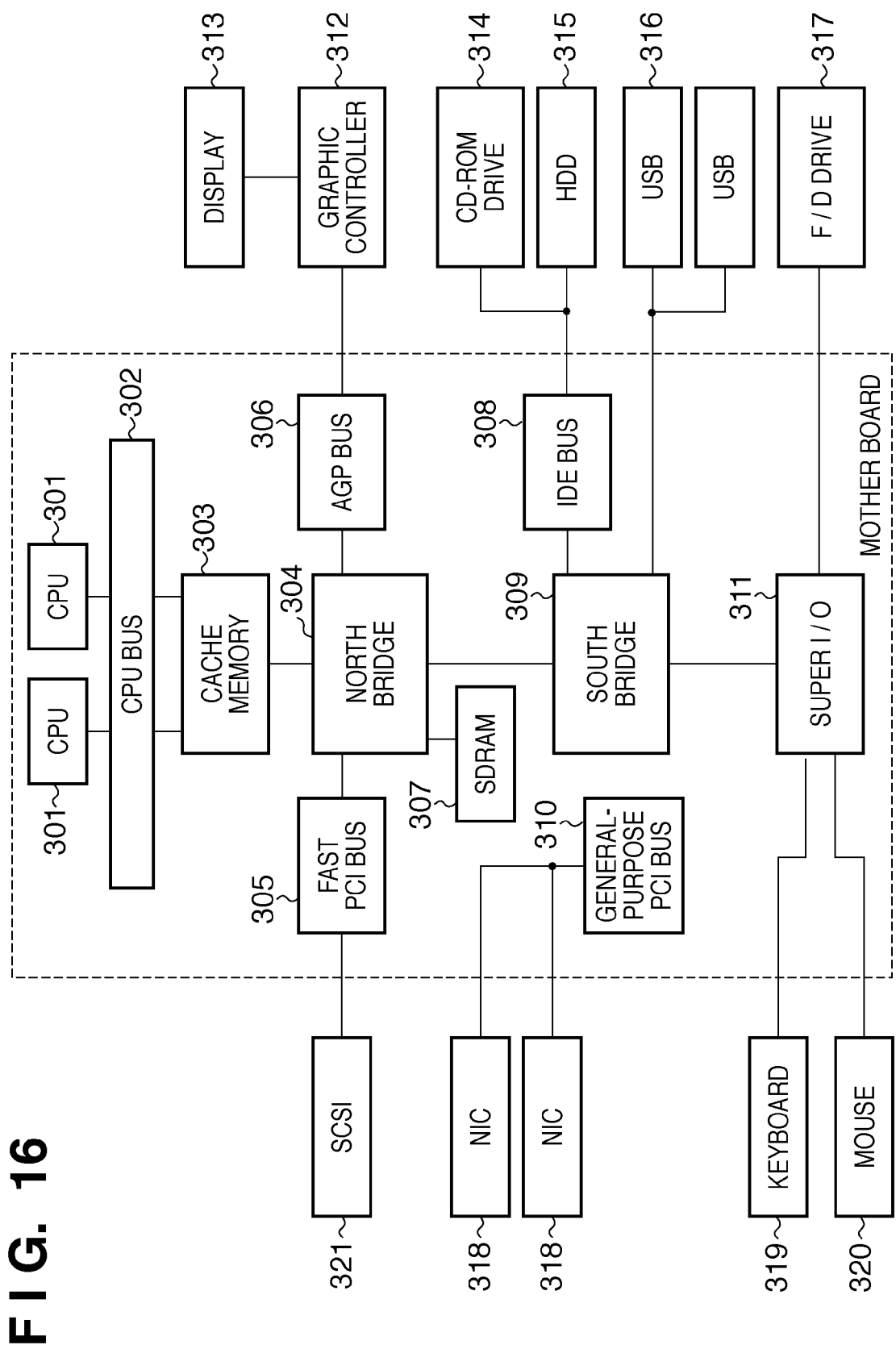
FIG. 16 is a block diagram showing an example of the hardware arrangement of a PC according to the embodiment.

Finally, a computer (to be referred to as a PC hereinafter) which serves as the job management server 1 and job management client 5 will be described below with reference to FIG. 16. As the hardware arrangement of the PC, arrangements having various connection methods, and various buses and interfaces are known. A hardware arrangement to be introduced in FIG. 16 is merely an example, and other arrangements may be adopted.

A portion bounded by the dotted line is a circuit board called a mother board, and functions to be described below are mounted on this mother board. Two CPUs 301 control whole software of this server PC, and are connected to a cache memory 303 via a CPU bus 302. LSI (Large Scale Integration) chips called a north bridge 304 and south bridge 309 control various buses on the mother board. A memory such as an SDRAM 307 is used for temporary storage of data in the server PC including data exchange between the north bridge 304 and south bridge 309.

The north bridge 304 has a fast PCI (Peripheral Component Interconnect) bus 305. A PCI bus having a 32-bit/66-MHz specification is prevalent. Also, still faster PCIExpress and PCI-X buses are available. In this case, a SCSI external device (for example, a hard disk drive for large-capacity data) can be accessed via a SCSI controller and SCSI interface 321. Furthermore, to the north bridge 304, a graphic controller 312 required to display an image on a display 313 is connected via an AGP bus 306.

Furthermore, a general-purpose PCI bus 310 (32 bits/33 MHz) is connected to the south bridge 309, and a NIC (Network Interface Card) 318 such as Ethernet® is connected. Note that two NICs are connected in FIG. 16 under the assumption that two network systems are to be connected. When only one network system is to be connected, one NIC may be used. However, when a fast NIC such as Gigabit Ethernet® is to be used, the fast PCI bus 305 on the north bridge side may be used so as to assure high performance. Also, the south bridge 309 has an IDE (Integrated Disk Electronics) bus 308. To the IDE bus 308, a hard disk drive (HDD) 315, CD-ROM (or CD-R or CD-R/W) drive 314, or a DVD (or DVD-R, DVD-R/W, or DVD-RAM) drive is connected. These drives are used to store various data including control software of the server PC, and to read out data at the time of installation of the server PC or to store large-capacity data (archives). To a USB port 316, a USB external device such as a USB memory is connected. The CPUs 301 are connected to a keyboard 319, mouse 320, or flexible disk drive (F/D drive) 317 via a super I/O 311 so as to input/output data. Note that the operations of the job management apparatus according to this embodiment are implemented when the CPUs execute programs stored in a computer-readable storage medium such as a ROM.

Figure 17:
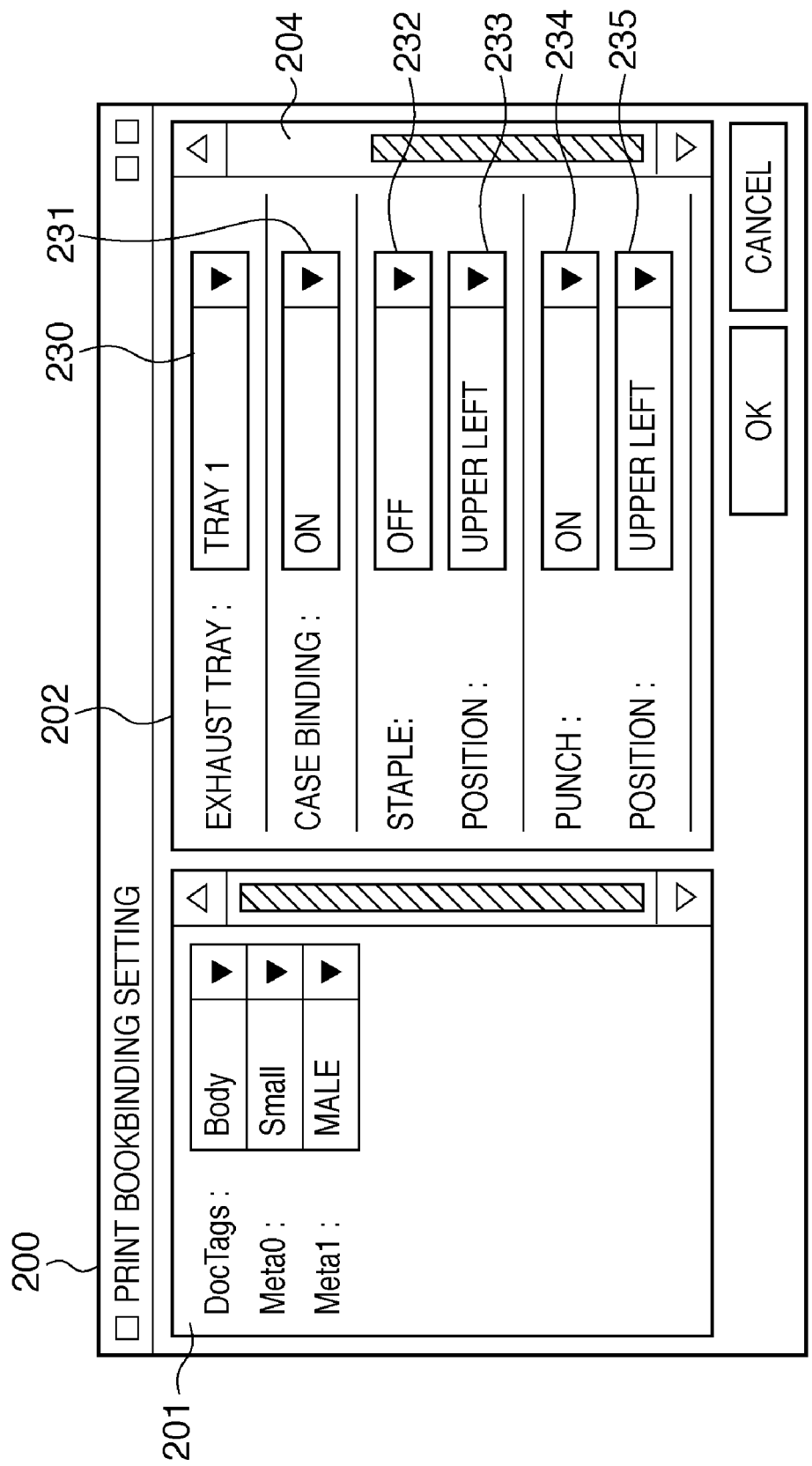
FIG. 17 is a view showing an example of a user interface window according to the embodiment.

As described above, metadata described in content data and a job ticket are classified into display and control metadata to edit metadata information. In this way, the record unit visibility in the job display, setting editing, and progress confirmation operations in the job management system of VDP jobs can be improved. As a result, a user interface, which can reduce errors in VDP record unit operations such as inspection and correspondence confirmation with a print result log, confirmation of records to be printed at the time of re-print processing, and setting changes, which are important upon execution of VDP jobs, can be provided. Even at the time of editing the print bookbinding settings, the setting can be edited while checking the correspondence with metadata. For example, since the window shown in FIG. 8 allows settings to [output printed products for males onto tray 1 and those for females onto tray 2], errors can be reduced at the time of confirmation of output products. FIG. 17 shows an example of a window on which an exhaust tray setting field is displayed using the scroll bar on the window shown in FIG. 8.

Note that this embodiment has exemplified data based on the PPML as content data which holds metadata. Also, the same effects can be expected in another variable data format that can hold metadata such as the PDF/VT as in the PPML. The same applies to different job ticket formats. Layers to which metadata are appended may include page and object layers in addition to the job and document layers, although they depend on the format of content data. In this embodiment, metadata appended to the job and document layers are used as criteria. However, when metadata are appended to page and object layers, they can be applied to metadata classification processing.

<Second Embodiment>

Figure 18:
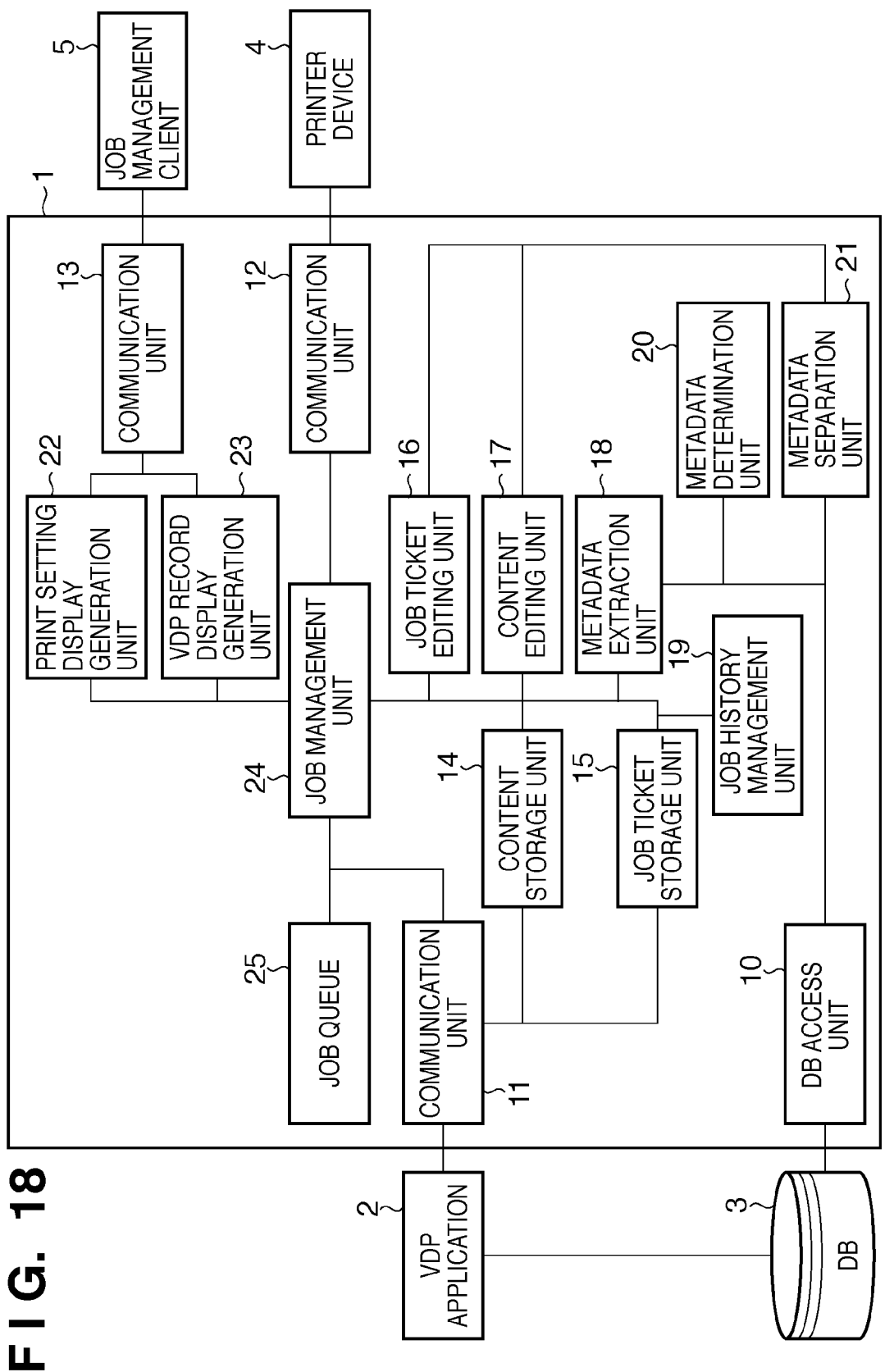
FIG. 18 is a block diagram showing an example of the overall arrangement of a job management apparatus according to the second embodiment.

The second embodiment of the present invention will be described below. Since the second embodiment has the same basic arrangement as in the first embodiment, only differences from the first embodiment will be described below. FIG. 18 is a block diagram of the second embodiment. FIG. 18 corresponds to FIG. 1 in the first embodiment. The same reference numerals in FIG. 18 denote the same blocks as in FIG. 1.

Referring to FIG. 18, a database (DB) access unit 10 accesses a database 3. In the second embodiment, a metadata separation unit 21 accesses the database 3 as a generation source of content data via the DB access unit 10, so as to identify metadata more accurately.

Figure 19:
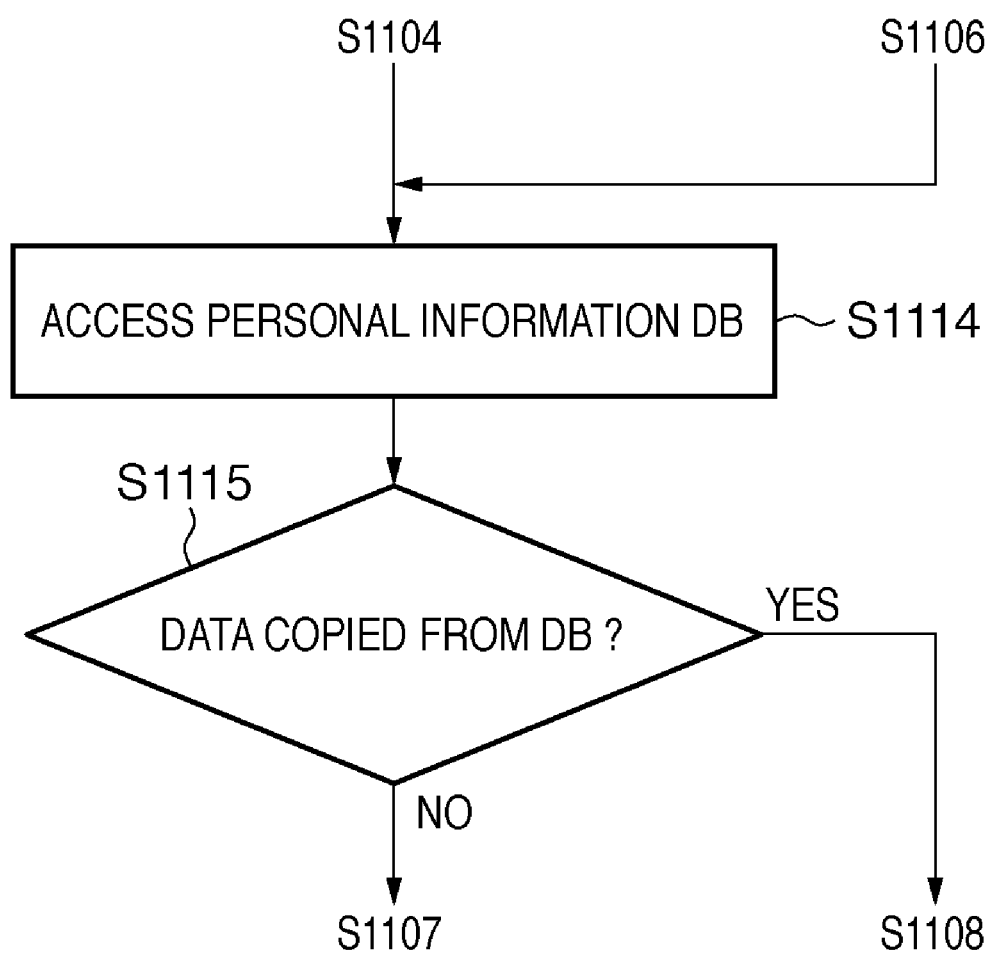
FIG. 19 is a flowchart according to the second embodiment.

FIG. 19 is a flowchart of the second embodiment. FIG. 19 corresponds to FIG. 13 in the first embodiment. FIG. 19 is a flowchart of steps different from FIG. 13. In FIG. 13, the process advances from step S1104 or S1106 to step S1108. In the second embodiment, the processes shown in FIG. 19 are executed between these steps.

If it is determined in step S1104 or S1106 that the process advances to step S1108, step S1114 in FIG. 19 is executed. In step S1114, the DB access unit 10 accesses the database 3 which registers personal information (customer information) of customers. It is checked based on a name of metadata of interest if customer information of a corresponding column is stored. It is then checked in step S1115 if the metadata of interest is copied from the customer information in the database 3. For example, as can be seen from the fact that the metadata of interest matches the column name, [gender] in the 7th line in FIG. 3 is copied from the database. Also, as can be seen from the fact that metadata does not match the column name in the database, [BookSize] in the 11th line in FIG. 3 is not copied from the database. If the metadata of interest is copied from the database ("YES" in step S1115), the process advances to step S1108; otherwise ("NO" in step S1115), the process advances to step S1107.

FIGS. 20, 21A, and 21B show examples of the edit results of content data and a job ticket corresponding to FIGS. 3 and 4 according to the processing shown in FIG. 19. As shown in the 7th and 12th lines in FIG. 20, [gender] is used as both display and control metadata. On the other hand, as can be seen from the 11th line, [BookSize] is determined as control metadata which is generated based on the age.

As described above, by accessing the database, metadata can be classified more accurately.

<Third Embodiment>

The third embodiment of the present invention will be described below. Since the third embodiment has the same basic arrangement as the second embodiment, only differences from the second embodiment will be described below. In the second embodiment, by accessing a database 3 via a DB access unit 10, each metadata and personal information are associated with each other. In the third embodiment, display metadata are deleted from content data except for record unit identifiers used to acquire information by accessing the database 3, and control metadata.

FIG. 22 shows an example of content data as the edit result of the third embodiment. FIG. 22 corresponds to content data shown in FIG. 20. In the third embodiment, display metadata except for ID data are deleted, and the contents of display metadata are obtained by referring to the database 3 when they are displayed on a window. As a result, only a user who has an access right to the database 3 can browse display metadata, i.e., personal information. FIG. 23 shows an example of a display window when some contents of display metadata are hidden (limited) for a user who has no access right to the database 3 according to the third embodiment.

As described above, when the user has an access right to the database, he or she can acquire and display the contents of metadata via the database, thus implementing display control of personal information.

<Fourth Embodiment>

The fourth embodiment of the present invention will be described below. Since the fourth embodiment has the same basic arrangement as in the first embodiment, only differences from the first embodiment will be described below. In the fourth embodiment, metadata having the same values in all records are excluded from display metadata.

Figure 24:
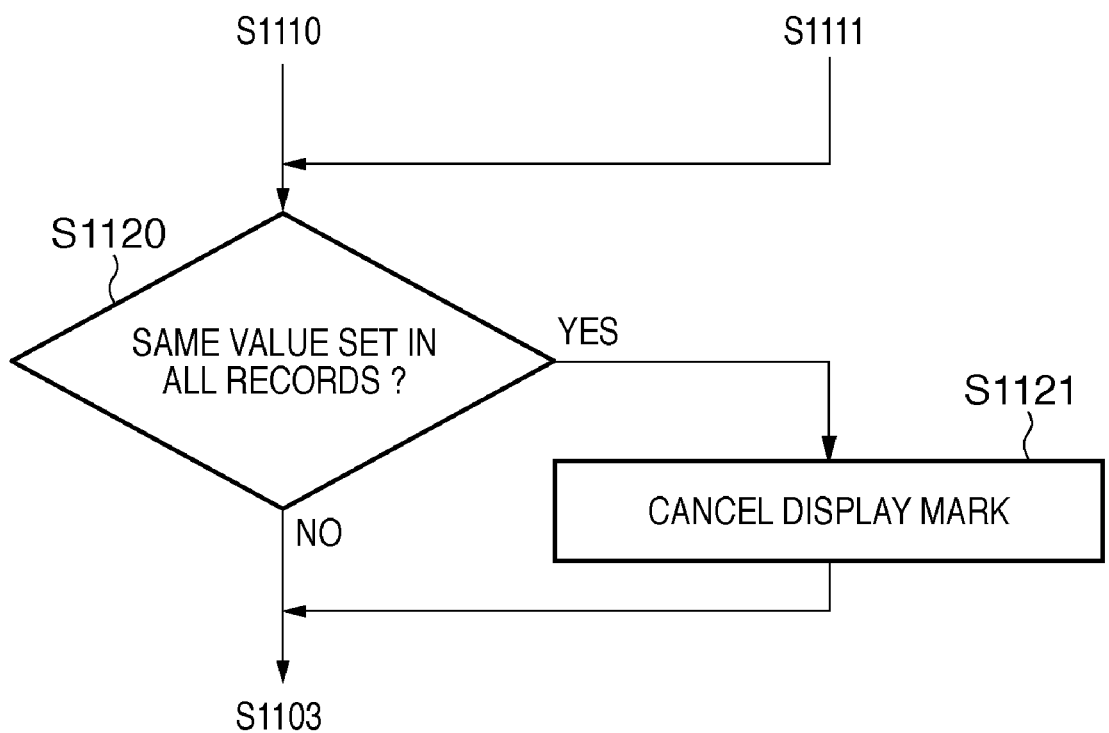
FIG. 24 is a flowchart according to the fourth embodiment.

FIG. 24 is a flowchart of the fourth embodiment. FIG. 24 corresponds to FIG. 13 in the first embodiment. FIG. 24 is a flowchart of steps different from FIG. 13. Although the process returns from step S1110 or S1111 to step S1103 in FIG. 13, the processes shown in FIG. 24 are executed between these steps in the fourth embodiment.

Upon completion of the process in step S1110 or S1111, the process advances to step S1120. It is checked in step S1120 if the value of metadata of interest in content data has the same value in all records. If the metadata of interest has the same value in all the records ("YES" in step S1120), the process advances to step S1121; otherwise ("NO" in step S1120), the process returns to step S1103. In step S1121, if the metadata of interest is marked as display metadata, that mark is canceled. Then, the process returns to step S1103.

As described above, by excluding metadata having the same value in all records from display metadata, unnecessary metadata can be controlled not to be displayed upon displaying records. In this way, the visibility of records can be improved.

Other Embodiments

An embodiment of the present invention provides a job management apparatus, which manages a job based on content data including designations associated with a content used in variable data print processing, and a corresponding job ticket, comprising:

a metadata extraction means configured to extract metadata from the content data;

a metadata classification means configured to classify the extracted metadata according to use applications;

a content data editing means operable to edit the content data to be assigned with identification information used to identify each use application of the metadata based on a classification result of said metadata classification means;

a job ticket editing means is operable to edit information used to refer to the metadata in the job ticket based on the classification result of said metadata classification means; and a holding means which holds the edited content data and job ticket.

A further embodiment provides a method of controlling a job management apparatus, which manages a job based on content data including designations associated with a content used in variable data print processing, and a corresponding job ticket, comprising:

a metadata extraction step of controlling a metadata extraction unit of the job management apparatus to extract metadata from the content data;

a metadata classification step of controlling a metadata classification unit of the job management apparatus to classify the extracted metadata according to use applications;

a content data editing step of controlling a content data editing unit of the job management apparatus to edit the content data to be assigned with identification information used to identify each use application of the metadata based on a classification result in the metadata classification step;

a job ticket editing step of controlling a job ticket editing unit of the job management apparatus to edit information used to refer to the metadata in the job ticket based on the classification result in the metadata classification step; and a holding step of controlling a holding unit of the job management apparatus to hold the edited content data and job ticket.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-065220, filed Mar. 17, 2009, which is hereby incorporated by reference herein in its entirety.

What is claimed is:

1. A job management apparatus, which managing, by record, a job based on content data which includes designations associated with a content used in variable data print processing, and a job ticket corresponding to the content data, comprising:

a metadata extraction unit which extracts metadata from the content data;

a metadata classification unit which classifies the extracted metadata as control metadata used to control processes of the job, and as display metadata used to make a display associated with the job; and a generation unit which generates first information used to display, by record, the job using values of the display metadata, wherein the metadata classification unit classifies the metadata which is set to the record as the display metadata and classifies the metadata which is referred to from the job ticket as the control metadata.

2. The apparatus according to claim 1, further comprising a job ticket editing unit which edits information used to refer to the control metadata in the job ticket.

3. The apparatus according to claim 1, wherein said generation unit generates second information used to display a screen used to issue print instruction or to edit a processing setting, based on a user instruction upon displaying the job based on the first information.

4. The apparatus according to claim 1, wherein the display using at least some values of the display metadata are limited according to user, when the job is displayed based on the first information.

5. The apparatus according to claim 1, further comprising a reception unit which transmits the content data and the job ticket to an external device which processes a job, and receives return data indicating a status of processing of the job from the external device,
wherein said generation unit generates third information used to identifiably display, by record, status of the job based on the return data received by said reception unit.

6. The apparatus according to claim 1, wherein said metadata classification unit classifies metadata set for each record or metadata which is not referred to from the job ticket as the display metadata.

7. The apparatus according to claim 1, wherein said metadata classification unit classifies the metadata as display metadata, control metadata, and metadata serving as both display and control metadata, and
said apparatus further comprises:
a content editing unit which edits the content data so as to include two metadata including display metadata and control metadata having the same value in correspondence with the metadata classified as the metadata serving as both display and control metadata by said metadata classification unit; and
a holding unit which holds the content data edited by said content data editing unit.

8. A method of controlling a job management apparatus, which managing, by record, a job based on content data which includes designations associated with a content used in variable data print processing, and a job ticket corresponding to the content data, comprising:
a metadata extraction step of controlling a metadata extraction unit of the job management apparatus to extract metadata from the content data;
a metadata classification step of controlling a metadata classification unit of the job management apparatus to classify the extracted metadata as control metadata used to control processes of the job, and as display metadata used to make a display associated with the job; and
a generation step of controlling a generation unit of the job management apparatus to generate first information used to display, by record, the job using values of the display metadata,
wherein the metadata classification step classifies the metadata which is set to the record as the display metadata and classifies the metadata which is referred to from the job ticket as the control metadata.

9. A non-transitory computer-readable storage medium storing a program for making a computer function as:
a metadata extraction unit which extracts metadata from content data;
a metadata classification unit which classifies the extracted metadata as control metadata used to control processes of a job, and as display metadata used to make a display associated with the job; and
a generation unit which generates first information used to display, by record, the job using values of the display metadata,
wherein the metadata classification unit classifies the metadata which is set to the record as the display metadata and classifies the metadata which is referred to from the job ticket as the control metadata.

10. The apparatus according to claim 1, further comprising a reception unit which receives the content data which comprises the metadata copied from a database,
wherein the metadata classification unit classifies the metadata which is copied from a database and is set to the record as the display metadata.

11. The apparatus according to claim 1,
wherein the metadata classification unit classifies the metadata which is set to the record and is not the same value in all records as the display metadata.

12. The method according to claim 8, further comprising a job ticket editing step of editing information used to refer to the control metadata in the job ticket.

13. The method according to claim 8, wherein the generating step generates second information used to display a screen used to issue print instruction or to edit a processing setting, based on a user instruction upon displaying the job based on the first information.

14. The method according to claim 8, wherein the display using at least some values of the display metadata are limited according to user, when the job is displayed based on the first information.

15. The method according to claim 8, further comprising a reception step of transmitting the content data and the job ticket to an external device which processes a job, and receiving return data indicating a status of processing of the job from the external device,
wherein the generating step generates third information used to identifiably display, by record, status of the job based on the return data received by said reception step.

16. The method according to claim 8, wherein said metadata classification step classifies metadata set for each record or metadata which is not referred to from the job ticket as the display metadata.

17. The method according to claim 8, wherein said metadata classification step classifies the metadata as display metadata, control metadata, and metadata serving as both display and control metadata, and
said method further comprises:
a content step of editing the content data so as to include two metadata including display metadata and control metadata having the same value in correspondence with the metadata classified as the metadata serving as both display and control metadata by said metadata classification step; and
a step of holding the content data edited by said content data editing step.

18. The method according to claim 8, further comprising a reception step of receiving the content data which comprises the metadata copied from a database,
wherein the metadata classification step classifies the metadata which is copied from a database and is set to the record as the display metadata.

19. The method according to claim 8, wherein the metadata classification step classifies the metadata which is set to the record and is not the same value in all records as the display metadata.

* * * * *